United States Patent [19]

Freitag et al.

[11] Patent Number: 5,104,723
[45] Date of Patent: * Apr. 14, 1992

[54] MIXTURES OF SPECIAL NEW POLYCARBONATES WITH OTHER THERMOPLASTICS OR WITH ELASTOMERS

[75] Inventors: Dieter Freitag, Krefeld; Uwe Westeppe, Mettmann; Kurt Weirauch, Bergisch-Gladbach; Günther Weymans, Leverkusen, all of Fed. Rep. of Germany

[73] Assignee: Bayer Aktiengesellschaft, Leverkusen, Fed. Rep. of Germany

[ * ] Notice: The portion of the term of this patent subsequent to Jun. 18, 2008 has been disclaimed.

[21] Appl. No.: 416,168

[22] Filed: Oct. 3, 1989

[30] Foreign Application Priority Data

Oct. 6, 1988 [DE] Fed. Rep. of Germany ....... 3833935
Nov. 1, 1988 [DE] Fed. Rep. of Germany ....... 3837089
Nov. 29, 1988 [DE] Fed. Rep. of Germany ....... 3840166

[51] Int. Cl.$^5$ .................... C08L 69/00; C08L 67/02; C08L 71/12; C08L 33/12
[52] U.S. Cl. .................... 428/220; 428/412; 528/196; 528/204; 525/67; 525/146; 525/148; 525/394; 525/433; 525/439; 525/453; 525/462; 525/469
[58] Field of Search .................... 528/196, 201, 204; 525/146, 148, 433, 439, 453, 462, 469, 67, 394; 428/220, 412

[56] References Cited

U.S. PATENT DOCUMENTS

| | | | |
|---|---|---|---|
| 4,368,315 | 1/1983 | Sikdar | 528/198 |
| 4,554,309 | 11/1985 | Mark | 528/196 |
| 4,748,151 | 5/1988 | Murata | 428/412 |
| 4,945,130 | 7/1990 | Genz et al. | 525/67 |
| 4,982,014 | 1/1991 | Freitag et al. | 568/721 |
| 5,025,065 | 6/1991 | Tacke | 528/196 |

FOREIGN PATENT DOCUMENTS 019126 11/1980 European Pat. Off. .
019127 11/1980 European Pat. Off. .
164477 12/1985 European Pat. Off. .

*Primary Examiner*—John C. Bleutge
*Assistant Examiner*—David Buttner
*Attorney, Agent, or Firm*—Joseph C. Gil; Richard E.·L. Henderson

[57] ABSTRACT

Mixtures containing
a) thermoplastic polycarbonates based on diphenols corresponding to formula (I)

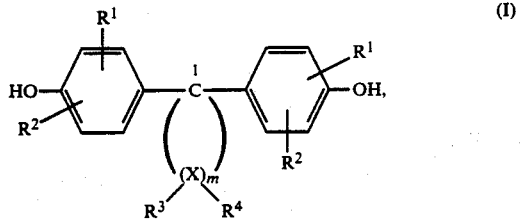

in which
$R^1$ and $R^2$ independently of one another represent hydrogen, halogen, $C_1$-$C_8$ alkyl, $C_5$-$C_6$ cycloalkyl, $C_6$-$C_{10}$ aryl and $c_7$-$C_{12}$ aralkyl,
m is an integer of from 4 to 7,
$R^3$ and $R^4$ may be individually selected for each X and independently of one another represent hydrogen or $C_1$-$C_6$ alkyl and
X represents carbon, with the proviso that, at at least one atom X, both $R^3$ and $R^4$ are alkyl, and
b) elastomers or other thermoplastics than those of component a) and, optionally,
c) standard additives, processes for their preparation, and the use thereof for the production of films.

11 Claims, No Drawings

MIXTURES OF SPECIAL NEW POLYCARBONATES WITH OTHER THERMOPLASTICS OR WITH ELASTOMERS

This invention relates to mixtures containing
a) thermoplastic polycarbonates based on diphenols corresponding to formula (I)

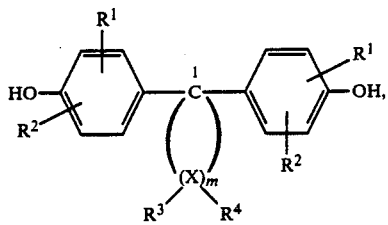

in which
R$^1$ and R$^2$ independently of one another represent hydrogen, halogen, C$_1$–C$_8$ alkyl, C$_5$–C$_6$ cycloalkyl, C$_6$–C$_{10}$ aryl and C$_7$–C$_{12}$ aralkyl,
m is an integer of from 4 to 7,
R$^3$ and R$^4$ may be individually selected for each X and independently of one another represent hydrogen or C$_1$–C$_6$ alkyl and
X represents carbon, with the proviso that, at least one atom X, both R$^3$ and R$^4$ are alkyl, and
b) elastomers or other thermoplastics than those of component a) and, optionally,
c) standard additives,
to processes for their preparation, and to the use thereof for the production of films.

German patent application P 3 832 396.6 describes the polycarbonates (a) of the mixtures according to the invention and also their starting products and their preparation.

Starting products for the polycarbonates (a) are dihydroxydiphenyl cycloalkanes corresponding to formula (I)

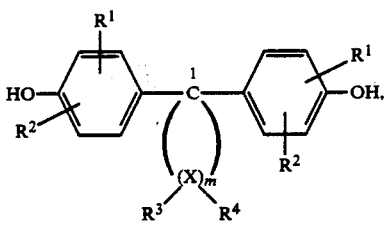

in which
R$^1$ and R$^2$ independently of one another represent hydrogen, halogen, preferably chlorine or bromine, C$_1$–C$_8$ alkyl, C$_5$–C$_6$ cycloalkyl, C$_6$–C$_{10}$ aryl, preferably phenyl, and C$_7$–C$_{12}$ aralkyl, preferably phenyl-C$_1$–C$_4$-alkyl, more particularly benzyl,
m is an integer of from 4 to 7, preferably 4 or 5,
R$^3$ and R$^4$, individually selected for each X, independently of one another represent hydrogen or C$_1$–C$_6$ alkyl and
X represents carbon,
with the proviso that, at least one atom X, both R$^3$ and R$^4$ are alkyl.

Preferably at 1 to 2 atoms X and, more particularly, at only 1 atom X, both R$^3$ and R$^4$ are alkyl. The preferred alkyl radical is methyl. The X atoms in the α-position to the diphenyl substituted C atom (C-1) are preferably not dialkyl-substituted, whereas the X atoms in the β-position to C-1 are preferably alkyl-disubstituted. Most preferably, one X atom in the β-position to C-1 is dialkyl-substituted and one X atom in the β-position is monoalkyl-substituted.

Preferred dihydroxydiphenyl cycloalkanes are those containing 5 and 6 ring C atoms in the cycloaliphatic radical (m=4 or 5 in formula (I)), for example diphenols corresponding to the following formulae

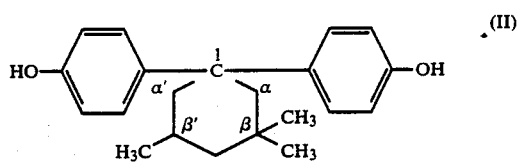

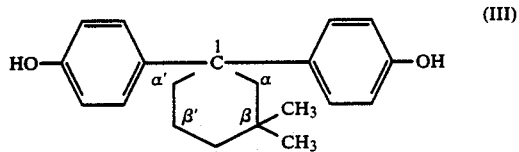

and

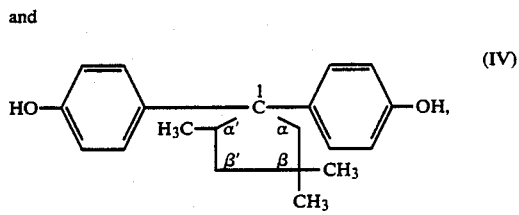

the 1,1-bis-(4-hydroxyphenyl)-3,3,5-trimethyl cyclohexane (formula II) being particularly preferred.

The dihydroxydiphenyl cycloalkanes corresponding to formula (I) may be obtained in known manner by condensation of phenols corresponding to formula (V)

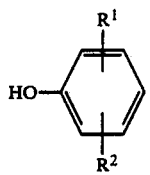

and ketones corresponding to formula (VI)

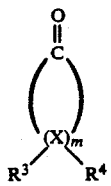

where X, R$^1$, R$^2$, R$^3$, R$^4$ and m in formulae (V) and (VI) are as defined for formula (I).

The phenols corresponding to formula (V) are either known from the literature or may be obtained by methods known from the literature (for cresols and xylenols, see for example Ullmanns Encyklopädie der technischen Chemie, 4th Revised and Extended edition, Vol. 15, pages 61–77, Verlag Chemie, Weinheim/New York, 1978; for chlorophenols, Ullmanns Encyklopädie der technischen Chemie, 4th Edition, Verlag Chemie 1979, Vol. 18, pages 191–214).

Examples of suitable phenols corresponding to formula (V) are phenol, o-cresol, m-cresol, 2,6-dimethylphenol, 2-chlorophenol, 3-chlorophenol, 2,6-dichlorophenol, 2-cyclohexylphenol, 2,6-diphenylphenol and o-benzylphenol.

The ketones corresponding to formula (VI) are known from the literature (cf. for example Beilsteins Handbuch der Organischen Chemie, Vol. 7, 4th Edition, Springer-Verlag, Berlin, 1925 and the corresponding Supplementary Volumes 1 to 4 and J. Am. Chem. Soc. Vol. 79, (1957), pages 1488–1492, U.S. Pat. No. 2,692,289, J. Chem. Soc., (1959), 2186–2192 and J. Org. Chem. Vol. 38 (1973), pages 4431–4435, J. Am. Chem. Soc. 87, (1965, pages 1353–1364. A general process for the production of ketones corresponding to formula (VI) is described, for example in "Organikum", 15th Edition, 1977, VEB-Deutscher Verlag der Wissenschaften, Berlin, for example on page 698.

The following are examples of known ketones corresponding to formula (VI): 3,3-dimethylcyclopentanone, 3,3-dimethylcyclohexanone, 4,4-dimethylcyclohexanone, 3-ethyl-3-methylcyclopentanone, 2,3,3-trimethylcyclopentanone, 3,3,4-trimethylcyclopentanone, 3,3-dimethylcycloheptanone, 4,4-dimethylcycloheptanone, 3-ethyl-3-methylcyclohexanone, 2,4,4-trimethylcyclohexanone, 3,3,4-trimethylcyclohexanone, 3,3,5-trimethylcyclohexanone, 3,4,4-trimethylcyclohexanone, 2,3,3,4-tetramethylcyclopentanone, 3,3,5-trimethylcycloheptanone, 3,5,5-trimethylcycloheptanone, 5-ethyl-2,5-dimethylcycloheptanone, 2,3,3,5-tetramethylcycloheptanone, 2,3,5,5-tetramethylcycloheptanone, 3,3,5,5-tetramethylcycloheptanone, 4-ethyl-2,3,4-trimethylcyclopentanone, 3-ethyl-4-isopropyl-3-methylcyclopentanone, 4-sec.-butyl-3,3-dimethylcyclopentanone, 2-isopropyl-3,3,4-trimethylcyclopentanone, 3-ethyl-4-isopropyl-3-methylcyclohexanone, 4-ethyl-3-isopropyl-4-methylcyclohexanone, 3-sec.-butyl-4,4-dimethylcyclohexanone, 2-butyl-3,3,4-trimethylcyclopentanone, 2-butyl-3,3,4-trimethylcyclohexanone, 4-butyl-3,3,5-trimethylcyclohexanone, 3-isohexyl-3-methylcyclohexanone and 3,3,8-trimethylcyclooctanone.

The following are examples of preferred ketones:

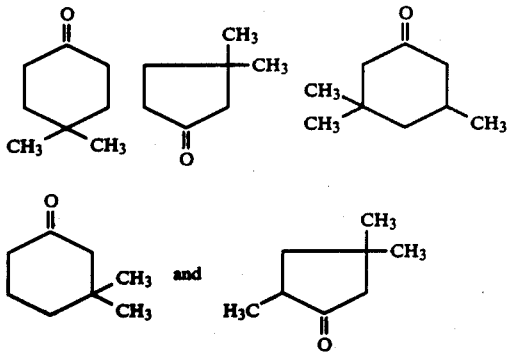

To prepare the bisphenols, the phenol (V) is generally used in a quantity of 2 to 10 mol and preferably in a quantity of 2.5 to 6 mol per mol ketone (VI). Preferred reaction times are from 1 to 100 hours. The reaction is generally carried out at a temperature in the range from −30° C. to 300° C. and preferably at a temperature in the range from −15° C. to 150° C. and under a pressure of from 1 to 20 bar and preferably under a pressure of from 1 to 10 bar.

The condensation is generally carried out in the presence of acidic catalysts such as, for example, hydrogen chloride, hydrogen bromide, hydrogen fluoride, boron trifluoride, aluminium trichloride, zinc dichloride, titanium tetrachloride, tin tetrachloride, phosphorus halides, phosphorus pentoxide, phosphoric acid, concentrated hydrochloric acid or sulfuric acid and also mixtures of acetic acid and acetanhydride. Acidic ion exchangers may also be used.

In addition, the reaction may be accelerated by addition of co-catalysts, such as $C_1$–$C_{18}$ alkyl mercaptans, hydrogen sulfide, thiophenols, thio acids and dialkyl sulfides, preferably in quantities of 0.01 to 0.4 mol/mol ketones, especially 0.05 to 0.2 mol/mol ketones.

The condensation may be carried out in the absence of solvents or in the presence of an inert solvent (for example an aliphatic or aromatic hydrocarbon, chlorinated hydrocarbon).

In cases where the catalyst also acts as a dehydrating agent, there is no need to use separate dehydrating agents, although, to obtain good conversions, it is always of advantage to use dehydrating agents when the catalyst used does not bind the water of reaction.

Suitable dehydrating agents are, for example, acetanhydride, zeolites, polyphosphoric acid and phosphorus pentoxide.

Phenol (V) and ketone (VI) may be reacted in a molar ratio of (V) to (VI) of from 2:1 to 10:1 and preferably from 2.5:1 to 6:1 at temperatures from −30° C. to 300° C., preferably at temperatures from −15° C. to 150° C. and under pressures of from 1 to 20 bar and preferably from 1 to 10 bar in the presence of acidic catalysts and optionally in the presence of co-catalysts and/or solvents and/or dehydrating agents.

In formula (I), $R^3$ and $R^4$ are both alkyl at preferably 1 to 2 atoms X, but more especially at only 1 atom X. The preferred alkyl radical is methyl, although ethyl or linear or branched $C_3$–$C_6$ alkyl radicals may also be used. The X atoms in the α-position to the diphenyl-substituted C atom (C-1) are preferably not dialkyl-substituted, whereas the X atoms in the β-position to C-1 are preferably dialkyl-substituted. Most preferred are compounds wherein one β-position is dialkyl-substituted and the other one is mono-alkyl-substituted.

In some cases, the reaction is not entirely uniform, i.e. several different products can be formed, so that the desired compound first has to be isolated from a mixture. For particulars of the condensation, reference may be made to Schnell, Chemistry and Physics of Polycarbonates, Interscience Publishers, New York 1964. In some cases, it is possible to control the reaction through the choice of suitable catalysts and reaction conditions in such a way that the desired compound precipitates or crystallizes out, which makes it easier to isolate. The preparation of the diphenol corresponding to formula (II) is described in the following:

EXAMPLE A.1

7.5 mol (705 g) phenol and 0.15 mol (30.3 g) dodecylthiol are introduced into a 1-liter round-bottomed flask equipped with a stirrer, dropping funnel, thermometer, reflux condenser and gas inlet pipe and saturated with dry HCl gas at 28° to 30° C. A solution of 1.5 mol (210 g) dihydroisophorone (3,3,5-trimethylcyclohexan-1-one) and 1.5 mol (151 g) phenol is added dropwise to the resulting solution over a period of 3 hours, HCl gas continuing to be passed through the reaction solution. After the addition, HCl gas is introduced for another 5 hours. The mixture is then left to react for 8 hours at room temperature. The excess phenol is then removed by steam distillation. The residue is hot-extracted twice with petroleum ether (60–90) and once with methylene chloride and filtered off. Yield: 370 g, Mp: 205°–207° C.

EXAMPLE A.2

Preparation of the diphenol of formula (II)

1692 g (18 mol) of phenol, 60.6 g (0.3 mol) of dodecylthiol and 420 g (3 mol) of dihydroisophorone (3,3,5-trimethylcyclohexan-1-one) are introduced into a stirring apparatus equipped with a stirrer, thermometer, reflux condenser and gas inlet pipe at 28°–30° C. Dry HCl gas is introduced into this solution over a period of 5 hours at 28°–30° C. The mixture is then left to react for about 10 h at 28°–30° C. When 95% of the ketone has been converted (examined by GC), 2.5 l of water are added to the reaction mixture and a pH value of 6 is adjusted by adding a 45% NaOH solution. The reaction mixture is stirred for one hour at 80° C. and then cooled to 25° C. The aqueous phase is decanted off and the remaining residue is washed with water at 80° C. The resulting crude product is filtered off and hot-extracted twice with n-hexane and twice with methylene chloride and then filtered. The residue is recrystallised twice from xylene.

Yield: 753 g Melting point: 209°–211° C.

EXAMPLE A.3

Preparation of the diphenol of formula (II)

564 (6 mol) of phenol, 10.8 g (0.12 mol) of butanethiol and 140 g (1 mol) of dihydroisophorone (3,3,5-trimethylcyclohexan-1-one) are introduced into a stirring apparatus equipped with a stirrer, thermometer, reflux condenser and gas inlet pipe at 30° C. At this temperature 44 g of 37% HCl are added. The reaction mixture is stirred for about 70 h at 28°–30° C. When 95% of the ketone has been converted (examined by GC) 2 l of water are added to the reaction mixture and a pH value of 6 is adjusted by adding a 45% NaOH solution. The reaction mixture is stirred for one hour at 80° C. and is then cooled to 25° C. The aqueous phase is decanted off and the remaining residue is washed with water at 80° C. The resulting crude product is filtered off and hot-extracted twice with n-hexane and twice with toluene and then filtered at 30° C.

Yield: 253 g Melting point: 205°–208° C.

EXAMPLE A.4

Preparation of the diphenol of the formula (Ib) ($R^1$ and $R^2 = CH_3$)

2196 g (18 mol) of 2,6-dimethylphenol, 38.2 g (0.36 mol) of β-mercaptopropionic acid and 420 g (3 mol) of dihydroisophorone (3,3,5-trimethylcyclohexan-1-one) are introduced into a stirring apparatus equipped with a stirrer, thermometer, reflux condenser and gas inlet pipe at 35° C. Dry HCl gas is introduced into this solution at 35° C. over a period of 5 h. The mixture is then left to react at 28°–30° C. for a period of about 10 hours. When 95% of the ketone has been converted (examined by GC) 2.5 l of water are added to the reaction mixture and a pH value of 6 is adjusted by the addition of a 45% NaOH solution. The reaction mixture is stirred for one hour at 80° C. and then cooled to room temperature. The aqueous phase is decanted off and the remaining residue is washed with water at 60° C. The resulting crude product is filtered off and hot-extracted three times with n-hexane and is then filtered.

Yield: 856 g Melting point: 236°–238° C.

EXAMPLE A.5

Preparation of the diphenol of formula (III)

Following the same procedure as in Example A.2 3 mol of 3,3-dimethylcyclohexanone are used instead of 3 mol of dihydroisophorone. The product had a melting point of 199°–201° C.

The polycarbonates (a) may be prepared from diphenols corresponding to formula (I) in accordance with German patent application P 38 32 396.6.

It is possible to use both a single diphenol corresponding to formula (I), in which case homopolycarbonates are formed, and also several diphenols corresponding to formula (I), in which case copolycarbonates are formed.

In addition, the diphenols corresponding to formula (I) may also be used in admixture with other diphenols, for example with those corresponding to the formula HO—Z—OH (VII), for the production of high molecular weight, thermoplastic aromatic polycarbonates.

Suitable other diphenols corresponding to the formula HO—Z—OH (VII) are those in which Z is an aromatic radical containing 6 to 30 C atoms which may contain one or more aromatic nuclei, may be substituted and may contain aliphatic radicals or other cycloaliphatic radicals than those corresponding to formula (I) or heteroatoms as bridge members.

Examples of diphenols corresponding to formula (VII) are hydroquinones, resorcinol, dihydroxydiphenyls, bis-(hydroxyphenyl)-alkanes, bis-(hydroxyphenyl)-cycloalkanes, bis-(hydroxyphenyl)-sulfides, bis-(hydroxyphenyl)-ethers, bis-(hydroxyphenyl)-ketones, bis-(hydroxyphenyl)-sulfones, bis-(hydroxyphenyl)-sulfoxides, α,α'-bis-(hydroxyphenyl)-diisopropylbenzenes and nucleus-halogenated compounds thereof.

These and other suitable other diphenols are described, for example, in U.S. Pat. Nos. 3,028,365, 2,999,835, 3,148,172, 3,275,601, 2,991,273, 3,271,367, 3,062,781, 2,970,131 and 2,999,846; in DE-OS 1 570 703, 2 063 050, 2 063 052, 2 211 0956, in FR-PS 1 561 518 and in the book by H. Schnell entitled "Chemistry and Physics of Polycarbonates", Interscience Publishers, New York, 1964.

Preferred other diphenols are, for example, 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, α,α'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfone, 2,4-bis-(3,5-dimethyl-4-hydroxyphenyl)-2-methylbutane, 1,1-bis-(3,5-dimethyl-4-hydroxyphenyl)-cyclohexane, α,α'-bis-(3,5-dimethyl-4-hydroxyphenyl)-p-diisopropylbenzene, 2,2-bis-(3,5-dichloro-4-hydroxyphenyl)-propane and 2,2-bis-(3,5-dibromo-4-hydroxyphenyl)-propane.

Particularly preferred diphenols corresponding to formula (VII) are, for example, 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

2,2-Bis-(4-hydroxyphenyl)-propane is particularly preferred.

The other diphenols may be used both individually and in admixture with one another.

The molar ratio of diphenols corresponding to formula (I) to the other diphenols optionally used, for example those corresponding to formula (VII), should be from 100 mol-% (I) and 0 mol-% other diphenol to 2 mol-% (I) and 98 mol-% other diphenol, preferably from 100 mol-% (I) and 0 mol-% other diphenol to 5 mol-% (I) and 95 mol-% other diphenol and, more preferably, from 100 mol-% (I) and 0 mol-% other diphenol to 10 mol-% (I) and 90 mol-% other diphenol and, most preferably, from 100 mol-% (I) and 0 mol-% other diphenol to 20 mol-% (I) and 80 mol-% other diphenol.

The high molecular weight polycarbonates of the diphenols corresponding to formula (I), optionally in combination with other diphenols, may be prepared by any of the known methods used to produce polycarbonates. The various diphenols may be attached to one another both statistically and also in blocks.

The polycarbonates may be branched in known manner. If branching is required, it may be achieved in known manner by co-condensation of small quantities, preferably of from 0.05 to 2.0 mol-% (based on diphenols used), of trifunctional or more than trifunctional compounds, particularly those containing three or more than three phenolic hydroxyl groups. Branching agents containing three or more than three phenolic hydroxyl groups include phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-(4,4-bis-(4-hydroxyphenyl)-cyclohexyl)-propane, 2,4-bis-(4-hydroxyphenylisopropyl)-phenol, 2,6-bis-(2-hydroxy-5'-methylbenzyl)-4-methylphenol, 2-(4-hydroxyphenyl)-2-(2,4-dihydroxyphenyl-propane, hexa-(4-(4-hydroxyphenylisopropyl)-phenyl)-orthoterephthalic acid ester, tetra-(4-hydroxyphenyl)-methane, tetra-(4-(4-hydroxyphenylisopropyl)-phenoxy)-methane and 1,4-bis-(4',4''-dihydroxytriphenyl)-methyl)-benzene.

Some of the other trifunctional compounds are 2,4-dihydroxybenzoic acid, trimesic acid, cyanuric chloride and 3,3-bis-(3-methyl-4-hydroxyphenyl)-2-oxo-2,3-dihydroindole.

Monofunctional compounds may be used in the usual concentrations as chain terminators for regulating the molecular weight of the polycarbonates (a) in known manner. Suitable compounds are, for example, phenol, tert.-butylphenols or other alkyl-$C_1$-$C_7$-substituted phenols. Small quantities of phenols corresponding to formula (VIII)

(VIII)

in which R is a branched $C_8$ and/or $C_9$ alkyl radical, are particularly suitable for regulating molecular weight. In the alkyl radical R, the percentage of $CH_3$ protons is between 47 to 89% and the percentage of CH and $CH_2$ protons between 53 to 11%. R is preferably in the o- and/or p-position to the OH group, 20% being the particularly preferred upper limit to the ortho component. The chain terminators are generally used in quantities of from 0.5 to 10 mol-% and preferably in quantities of from 1.5 to 8 mol-%, based on the diphenols used.

The polycarbonates (a) may be produced in known manner, preferably by the phase interface polycondensation process (cf. H. Schnell "Chemistry and Physics of Polycarbonates", Polymer Reviews, Vol. IX, pages 33 et seq, Interscience Publ., 1964). In this process, the diphenols corresponding to formula (I) are dissolved in an aqueous alkaline phase. To prepare copolycarbonates with other diphenols, mixtures of diphenols corresponding to formula (I) and the other diphenols, for example those corresponding to formula (VII), are used. Chain terminators, for example corresponding to formula (VIII), may be added to regulate molecular weight. The reaction is then carried out with phosgene by the phase interface polycondensation method in the presence of an inert, preferably polycarbonate-dissolving, organic phase. The reaction temperature is in the range from 0° to 40° C.

The branching agents optionally used (preferably 0.05 to 2 mol-%) may be initially introduced either with the diphenols in the aqueous alkaline phase or may be added in solution in the organic solvent before the phosgenation.

In addition to the diphenols of formula (I) and, optionally, other diphenols (VII), mono- and/or bis-chlorocarbonic acid esters thereof may also be used, being added in solution in organic solvents. The quantity of chain terminators and branching agents used is then determined by the molar quantity of diphenolate residues corresponding to formula (I) and, optionally, formula (VII). Where chlorocarbonic acid esters are used, the quantity of phosgene may be reduced accordingly in known manner.

Suitable organic solvents for the chain terminators and, optionally, for branching agents and the chlorocarbonic acid esters are, for example, methylene chloride, chlorobenzene, acetone, acetonitrile and mixtures of these solvents, particularly mixtures of methylene chloride and chlorobenzene. The chain terminators and branching agents used may optionally be dissolved in the same solvent.

The organic phase for the phase interface polycondensation may be formed, for example, by methylene chloride, chlorobenzene and by mixtures of methylene chloride and chlorobenzene.

Aqueous NaOH solution for example is used as the aqueous alkaline phase.

The production of the polycarbonates (a) by the phase interface polycondensation process may be catalyzed in the usual way by such catalysts as tertiary amines, particularly tertiary aliphatic amines, such as tributylamine or triethylamine. The catalysts may be used in quantities of from 0.05 to 10 mol-%, based on mols diphenols used. The catalysts may be added before the beginning of phosgenation or during or even after phosgenation.

The polycarbonates (a) may also be produced by the known homogeneous-phase process, the so-called "pyridine process" and also by the known melt transesterification process using diphenyl carbonate for example instead of phosgene.

The polycarbonates (a) preferably have molecular weights $\overline{M}w$ (weight average, as determined by gel chromatography after preliminary calibration) of at least 10,000 and, more preferably, in the range from 10,000 to 300,000 and, most preferably, where the polycarbonates are used for the production of injection-molded articles, in the range from 20,000 to 80,000. They may be linear or branched and are homopolycarbonates or copolycarbonates based on the diphenols corresponding to formula (I).

Accordingly, polycarbonates (a) in the context of the invention are high molecular weight, thermoplastic, aromatic polycarbonates having $\overline{M}w$ values (weight average molecular weights) of at least 10,000, preferably in the range from 10,000 to 300,000 and more preferably, where the polycarbonates are used for the production of injection molded articles, in the range from 20,000 to 80,000 which contain difunctional carbonate structural units corresponding to formula (Ia)

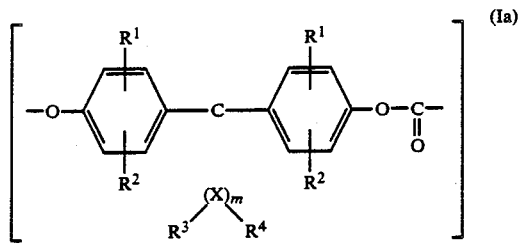

in which X, $R^1$, $R^2$, $R^3$, $R^4$ and m are as defined for formula (I), in quantities of from 100 mol-% to 2 mol-%, preferably in quantities of from 100 mol-% to 5 mol-%, more preferably in quantities of from 100 mol-% to 10 mol-% and, most preferably, in quantities of from 100 mol-% to 20 mol-%, based in each case on the total quantity of 100 mol-% of difunctional carbonate structural units in the polycarbonate.

Accordingly, the polycarbonates contain quantities—complementary in each case to 100 mol-%—of other difunctional carbonate structural units, for example those corresponding to formula (VIIa)

i.e. in quantities of from 0 mol-% (inclusive) to 98 mol-% inclusive, preferably from 0 mol-% to 95 mol-%, more preferably from 0 mol-% to 90 mol-% and most preferably from 0 mol-% to 80 mol-%, based in each case on the total quantity of 100 mol-% of difunctional carbonate structural units in the polycarbonate. (—Z— in formula (VIIa) corresponds to the —Z— in formula (VII)].

New polycarbonates which combine high heat resistance with other favorable properties are obtained through the incorporation of the diphenols corresponding to formula (I). This applies in particular to the polycarbonates based on the diphenols (I), in which m is 4 or 5, and more particularly to the polycarbonates based on diphenols corresponding to formula (Ib)

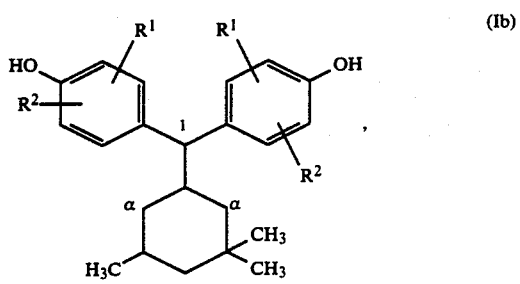

in which $R^1$ and $R^2$ independently of one another have the meaning defined for formula (I) and, more preferably, represent hydrogen.

The preferred polycarbonates (a) are those in which, in the structural units corresponding to formula (Ia), m is 4 or 5, and more especially those of units corresponding to formula (Ic)

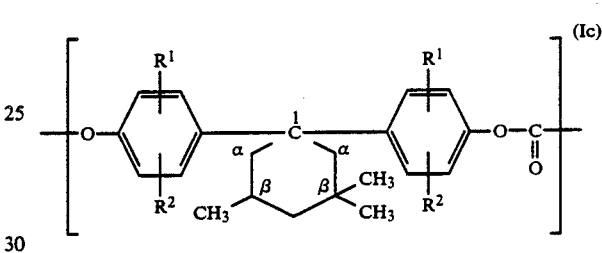

in which $R^1$ and $R^2$ are as defined for formula (Ia), but are preferably hydrogen.

These polycarbonates based on the diphenols corresponding to formula (Ib), in which $R^1$ and $R^2$ are preferably hydrogen, also show high UV stability and good flow behavior in the melt in addition to their high heat resistance.

In addition, the properties of the polycarbonates may be varied with advantage through their combination with other diphenols, particularly with the diphenols corresponding to formula (VII).

Examples B.1 to B.5 below describe the production of polycarbonates (a). The relative viscosity was measured on 0.5% by weight solutions of the polycarbonates in $CH_2Cl_2$.

The glass temperature was measured by differential scanning calorimetry (DSC).

EXAMPLE B.1

31.0 g (0.1 mol) of the diphenol of Example (A.1), 33.6 g (0.6 mol) KOH and 560 g water are dissolved while stirring in an inert gas atmosphere. A solution of 0.188 g phenol in 560 ml methylene chloride is then added. 19.8 g (0.2 mol) phosgene were introduced into the thoroughly stirred solution at pH 13 to 14 and at 21° to 25° C. 0.1 ml ethyl pyridine is then added, followed by stirring for 45 minutes. The bisphenolate-free aqueous phase is separated off, the organic phase is washed with water until neutral after acidification with phosphoric acid and is freed from the solvent. The polycarbonate had a relative solution viscosity of 1.259.

The glass temperature of the polymer was found to be 233° C. (DSC).

EXAMPLE B.2

68.4 g (0.3 mol) bisphenol A (2,2-bis-(4-hydroxyphenyl)-propane, 217.0 g (0.7 mol) diphenol of Example (A.1), 336.6 g (6 mol) KOH and 2700 g water are dissolved with stirring in an inert gas atmosphere. A solution of 1.88 g phenol in 2500 ml methylene chloride is then added. 198 g (2 mol) phosgene were introduced into the thoroughly stirred solution at pH 13 to 14 and at 21° to 25° C. 1 ml ethyl piperidine is then added, followed by stirring for 45 minutes. The bisphenolate-free aqueous phase is separated off, the organic phase is washed with water until neutral after acidification with phosphoric acid and is freed from the solvent. The polycarbonate had a relative viscosity of 1.336.

The glass temperature of the polymer was found to be 212° C. (DSC).

EXAMPLE B.3

A mixture of 114 g (0.5 mol) bisphenol A and 155 g (0.5 mol) of the diphenol of Example (A.1) was reacted as in Example B.2 to form the polycarbonate.

The polycarbonate had a relative solution viscosity of 1.386.

The glass temperature of the polymer was found to be 195° C. (DSC).

EXAMPLE B.4

A mixture of 159.6 g (0.7 mol) bisphenol A and 93 g (0.3 mol) of the diphenol of Example (A.3) was reacted as in Example B.2 to form the polycarbonate.

The polycarbonate had a relative solution viscosity of 1.437.

The glass temperature of the polymer was found to be 180° C. (DSC).

EXAMPLE B.5

31.0 g (0.1 mol) of the diphenol of Example (A.3), 24.0 g (0.6 mol) NaOH and 270 g water are dissolved with stirring in an inert gas atmosphere. A solution of 0.309 g 4-(1,1,3,3-tetramethylbutyl)-phenol in 250 ml methylene chloride is then added. 19.8 g (0.2 mol) phosgene were introduced into the thoroughly stirred solution at pH 13 to 14 and at 21° to 25° C. 0.1 ml ethyl piperidine is then added, followed by stirring for 45 minutes. The bisphenolate-free aqueous phase is separated off, the organic phase is washed with water until neutral after acidification with phosphoric acid and is freed from the solvent. The polycarbonate had a relative solution viscosity of 1.314.

The glass temperature of the polymer was found to be 234° C. (DSC).

EXAMPLE B.6

148.2 g (0.65 mol) of 2,2-bis-(4-hydroxyphenyl)-propane, 108.5 g (0.35 mol) of the diphenol of Example (A.1), 336.6 g (6 mols) of KOH and 2700 g of water are dissolved with stirring in an inert gas atmosphere. Then a solution of 8.86 g of 4-(1,1,3,3-tetramethylbutyl)-phenol in 2500 ml of methylene chloride is added. 198 g (2 mols) of phosgene are introduced into the thoroughly stirred solution at a pH of 13-14 and at a temperature of 21°-25° C. Then 1 ml of N-ethyl piperidine is added and the mixture is stirred for a further 45 minutes. The bisphenolate-free aqueous phase is separted off, the organic phase is washed with water until neutral after acidification with phosphoric acid and is freed from the solvent. The polycarbonate had a relative solution viscosity of 1.20.

EXAMPLE B.7

3.875 kg (12.5 mol) of the bisphenol of Example (A.2) are dissolved with stirring under an inert gas atmosphere in 6.675 kg of 45% NaOH and 30 l of water. Then 9.43 l of methylene chloride, 11.3 l of chlorobenzene and 23.5 g of phenol are added. 2.475 kg of phosgene are introduced into the well-stirred solution at a pH of 13-14 and at 20°-25° C. After the introduction is complete 12.5 ml of N-ethylpiperidine are added. The mixture is then left to react for 45 minutes. The bisphenolate-free aqueous phase is separated off, the organic phase is acidified with phosphoric acid and then washed until free from electrolytes and freed from solvent.

relative viscosity: 1,300 glass transition temperature: 238° C.

EXAMPLE B.8

15.5 g (0.05 mol) of the bisphenol of Example A.3, 13.4 g (0.05 mol) of bis-(4-hydroxyphenyl)-cyclohexane (bisphenol Z) and 24.0 g (0.6 mol) of NaOH are dissolved with stirring in 362 ml of water under an inert gas atmosphere. Then 0.516 g of 4-(1,1,3,3-tetramethylbutyl)phenol dissolved in 271 ml of methylene chloride is added. 19.8 g of phosgene are introduced at a pH of 13-14 and at 20°-25° C. into the thoroughly-stirred solution. 5 minutes after the introduction is complete 0.1 ml of N-ethylpiperidine are added. The mixture is then left to react for 45 minutes. The bisphenolate-free aqueous phase is separated off and the organic phase is acidified with phosphoric acid and then washed until neutral and freed from solvent.

relative viscosity: 1,297 glass transition temperature: 208° C.

EXAMPLE B.9

15.5 g (0.05 mol) of the bisphenol of Example (A.1), 17.6 g (0.05 mol) of 4,4'dihydroxytetraphenylmethane and 24.0 g (0.6 mol) of NaOH are dissolved with stirring in 411 ml of water under an inert gas atmosphere. Then 0.516 g of 4-(1,1,3,3-tetramethylbutyl)-phenol dissolved in 308 ml of methylene chloride are added. 19.8 g of phosgene are introduced into the thoroughly-stirred solution at a pH of 13-14 and at 20°-25° C. 5 minutes after the introduction is complete 0.1 ml of N-ethylpiperidine is added. The mixture is then left to react for 45 minutes. The bisphenolate-free aqueous phase is separated off and the organic phase is acidified with phosphoric acid and then washed until neutral and freed from solvent.

relative viscosity: 1.218 glass transition temperature: 212° C.

EXAMPLE B.10

18.3 g (0.05 mol) of the bisphenol of Example (A.4) and 23.6 g (0.42 mol) of KOH are dissolved with stirring in 100 ml of water under an inert gas atmosphere. Then 100 ml of methylene chloride are added. 17.3 g of phosgene are introduced into the thoroughly-stirred solution at a pH of 13-14 and at 20°-25° C. 5 minutes after the introduction is complete 0.3 ml of N-ethylpiperidine is added. The mixture is then left to react for 45 minutes. The bisphenolate-free aqueous phase is separated off and the organic phase is acidified with phosphoric acid and then washed until neutral and freed from solvent.

relative viscosity: 1.310 glass transition temperature: 241° C.

EXAMPLE B.11

29.6 g (0.1 mol) of the bisphenol of Example (A.5) and 24.0 g (0.6 mol) of NaOH are dissolved with stirring in 370 ml of water under an inert gas atmosphere. Then 0.413 g of 4-(1,1,3,3-tetramethylbutyl)phenol dissolved in 277 ml of methylene chloride are added 19.8 g of phosgene are introduced into the thoroughly-stirred solution at a pH of 13-14 and at 20°-25° C. 5 minutes after the introduction is complete 0.1 ml of N-ethylpiperidine are added. The mixture is then left to react for 45 minutes. The bisphenolate-free aqueous phase is separated off and the organic phase is acidified with phosphoric acid and then washed until neutral and freed from solvent.

relative viscosity: 1.370 glass transition temperature: 193° C.

EXAMPLE B.12

62.0 g (0.2 mol) of bisphenol A.1, 182.4 g (0.8 mol) of bisphenol A and 240 g (6 mol) of NaOH are dissolved with stirring in 2400 ml of water under an inert gas atmosphere. Then 6.603 g of 4-(1,1,3,3-tetramethylbutyl)-phenol dissolved in 2400 ml of methylene chloride are added. 198 g of phosgene are introduced into the thoroughly-stirred solution at a pH of 13-14 and at 20°-25° C. 5 minutes after the introduction is complete 1 ml of N-ethylpiperidine is added. The mixture is then left to react for 45 minutes. The bisphenolate-free aqueous phase is separated off and the organic phase is acidified with phosphoric acid and then washed until neutral and freed from solvent.

relative viscosity: 1.298 glass transition temperature: 172° C.

EXAMPLE B.13

170.5 g (0.55 mol) of the bisphenol of Example (A.3), 102.6 g (0.45 mol) of bisphenol A and 240 g (6 mol) of NaOH are dissolved with stirring in 2400 ml of water under an inert gas atmosphere. Then 5.158 g of 4-(1,1,3,3-tetramethylbutyl)-phenol dissolved in 2400 ml of methylene chloride are added. 198 g of phosgene are introduced into the thoroughly-stirred solution at a pH of 13-14 and at 20°-25° C. 5 minutes after the introduction is complete 1 ml of N-ethylpiperidine is added. The mixture is then left to react for 45 minutes. The bisphenolate-free aqueous phase is separated off and the organic phase is acidified with phosphoric acid and then washed until neutral and freed from solvent.

relative viscosity: 1.302 glass transition temperature: 203° C.

EXAMPLE B.14

108.5 g (0.35 mol) of the bisphenol of Example (A.1), 148.2 g (0.65 mol) of bisphenol A and 240 g (6 mol) of NaOH are dissolved with stirring in 2400 ml of water under an inert gas atmosphere. Then 6.189 g of 4-(1,1,3,3-tetramethylbutyl)-phenol dissolved in 2400 ml of methylene chloride are added. 198 g of phosgene are introduced into the thoroughly-stirred solution at a pH of 13-14 and at 20°-25° C. 5 minutes after the introduction is complete 1 ml of N-ethylpiperidine is added. The mixture is then left to react for 45 minutes. The bisphenolate-free aqueous phase is separated off and the organic phase is acidified with phosphoric acid and then washed until neutral and freed from solvent.

relative viscosity: 1.305 glass transition temperature: 185° C.

To assess the UV stability of the new polycarbonates, the formation of primary radicals under UV irradiation with a mercury vapor lamp (edge filter 305 nm) was determined in comparison with a polycarbonate based on 2,2-bis-(4-hydroxyphenyl)-propane. It was found that the polycarbonate of Example B.1 shows a lower primary radical formation rate and, therefore, higher UV stability.

The present invention relates to mixtures containing
a) from 0.1% by weight to 99.9% by weight, preferably from 1% by weight to 98% by weight and more preferably from 2.5% by weight to 90% by weight of high molecular weight, thermoplastic, aromatic polycarbonates having $\overline{M}w$ values (weight average molecular weights) of at least 10,000, preferably from 10,000 to 300,000 and more preferably, where the mixtures are used for the production of injection-molded articles, from 20,000 to 80,000 which contain difunctional carbonate structural units corresponding to formula (Ia)

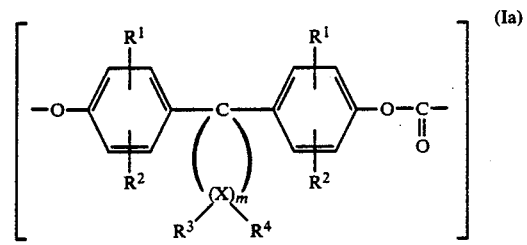

in which X, $R^1$, $R^2$, $R^3$, $R^4$ and m are as defined for formula (I), in quantities of from 100 mol-% to 2 mol-%, preferably of from 100 mol-% to 5 mol-%, more preferably of from 100 mol-% to 10 mol-% and, most preferably, in quantities of from 100 mol-% to 20 mol-% in addition to the quantity—complementary to 100 mol-%—of other difunctional carbonate structural units, b) from 99.9% by weight to 0.1% by weight, preferably from 99% by weight to 2% by weight and more preferably from 97.5% by weight to 10% by weight of elastomers or other thermoplastics than the polycarbonates of component a).

Particularly suitable polycarbonates (a) are those in which, in the structural units corresponding to formula (Ia), m is 4 or 5, more especially those containing structural units corresponding to formula (Ic)

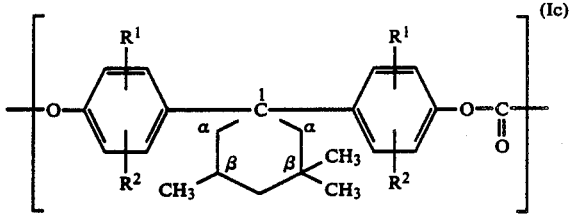

in which $R^1$ and $R^2$ are as defined for formula (Ia), but are preferably hydrogen.

Other thermoplastics suitable as component (b) in the mixtures according to the invention are both
b1) amorphous thermoplastics, preferably those having a glass temperature of more than 40° C. and more especially in the range from 60° C. to 220° C., and also b2) partially crystalline thermoplastics, preferably those having a melting temperature of more than 60° C. and more especially in the range from 80° C. to 400° C. Elastomers for components b) of the mixtures according to the invention are b3) polymers which have a glass temperature below 0° C., preferably below −10° C. and more especially in the range from −15° C. to −140° C.

Examples of other amorphous thermoplastics b1) are amorphous polymers from the class of polycarbonates, polyesters, polyestercarbonates, polyamides, polyolefins, polysulfones, polyketones, thermoplastic vinyl polymers, such as polymethyl acrylates, or homopolymers of aromatic vinyl compounds, copolymers of aromatic vinyl compounds or graft polymers of vinyl monomers on rubbers, polyethers, polyimides and thermoplastic polyurethanes.

Examples of crystalline thermoplastics b2) are aliphatic polyesters, polyarylene sulfides and the partially crystalline representatives of the thermoplastics listed above under b1).

Examples of elastomers b3) are the various rubbers, such as ethylene-propylene rubber, polyisoprene, polychloroprene, polysiloxanes, atactic polypropylene, diene, olefin and acrylate rubbers and natural rubbers, styrenebutadiene block copolymers, copolymers of ethylene with vinyl acetate or with (meth)acrylates, elastic polyurethanes, unless listed as thermoplastics under b1) or b2), and elastic polycarbonate-polyether block copolymers.

Amorphous thermoplastics b1) are, in particular other polycarbonates than those according to German patent application P 3 832 396.6. These other polycarbonates may be both homopolycarbonates and also copolycarbonates and may be both linear and branched. The particularly preferred bisphenol for the polycarbonates is bisphenol A [=2,2-bis-(4-hydroxyphenyl)-propane].

These other thermoplastic polycarbonates are known.

The molecular weights $\overline{M}w$ (weight average molecular weight, as determined by gel permeation chromatography in tetrahydrofuran) of the other thermoplastic polycarbonates are in the range from 10,000 to 300,000 and preferably in the range from 12,000 to 150,000.

The other thermoplastic polycarbonates may be used both individually and in admixture for component b) of the mixtures according to the invention.

Preferred other thermoplastics for component b) for the production of the mixtures according to the invention are also aliphatic, thermoplastic polyesters, more preferably polyalkylene terephthalates, i.e. for example those based on ethylene glycol, propane-1,3-diol, butane-1,4-diol, hexane-1,6-diol and 1,4-bis-hydroxymethylcyclohexane.

The molecular weights ($\overline{M}w$) of these polyalkylene terephthalates are in the range from 10,000 to 80,000. The polyalkylene terephthalates may be obtained by known methods, for example from terephthalic acid dialkyl ester and the corresponding diol by transesterification (cf. for example U.S. Pat. Nos. 2,647,885, 2,643,989, 2,534,028, 2,578,660, 2,742,494, 2,901,466). These polyesters are known.

Preferred other thermoplastics also include thermoplastic polyamides.

Suitable thermoplastic polyamides are any partially crystalline polyamides, particularly polyamide-6, polyamide-6,6, and partially crystalline copolyamides based on these two components. Other suitable thermoplastic polyamides are partially crystalline polyamides of which the acid component consists completely or in part of, in particular, adipic acid or caprolactam of terephthalic acid and/or isophthalic acid and/or suberic acid and/or sebacic acid and/or azelaic acid and/or dodecane dicarboxylic acid and/or adipic acid and/or cyclohexane dicarboxylic acid, and of which the diamine component consists completely or in part of, in particular, m- and/or p-xylylenediamine and/or tetramethylenediamine and/or hexamethylenediamine and/or 2,2,4- and/or 2,4,4-trimethyl hexamethylenediamine and/or isophoronediamine and/or 1,4-diaminobutane and of which the compositions are known in principle from the prior art (cf. for example Encyclopedia of Polymers, Vol. 11, pages 315 et seq.).

Other suitable thermoplastic polyamides are partially crystalline polyamides produced completely or in part from lactams containing 6 to 12 carbon atoms, optionally using one or more of the starting components mentioned above.

Particularly preferred partially crystalline polyamides are polyamide-6 and polyamide-6,6 or copolyamides containing a small amount (up to about 10% by weight) of other co-components.

Suitable polyamides are also amorphous polyamides obtained, for example, by polycondensation of diamines such as for example hexamethylenediamines, decamethylenediamine, 2,2,4- and 2,4,4-trimethyl hexamethylenediamine, m- or p-xylylenediamine, bis-(4-aminocyclohexyl)-methane, mixtures of 4,4'- and 2,2'-diaminodicyclohexyl methanes, 2,2-bis-(4-aminocyclohexyl)-propane, 3,3'-dimethyl-4,4'-diaminodicyclohexyl methane, 3-aminoethyl-3,5,5-trimethyl cyclohexyl amine, 2,5-bis-(aminomethyl)-norbornane, 2,6-bis-(aminomethyl)-norbornane, 1,4-diaminomethyl cyclohexane, and of mixtures of these diamines, with dicarboxylic acids, such as for example oxalic acid, adipic acid, azelaic acid, decane dicarboxylic acid, heptadecane dicarboxylic acid, 2,2,4-trimethyl adipic acid, 2,4,4-trimethyl adipic acid, isophthalic acid and terephthalic acid, and with mixtures of these dicarboxylic acids. Accordingly, amorphous copolyamides obtained by polycondensation of several of the diamines and/or dicarboxylic acids mentioned above are also included. Amorphous copolyamides prepared using ω-aminocarboxylic acids, such as ω-aminocaproic acid, ω-aminoundecanoic acid or ω-aminolauric acid, or lactams thereof, are also included.

Particularly suitable amorphous, thermoplastic polyamides are those obtainable from isophthalic acid, hexamethylenediamine and other diamines, such as 4,4'-diaminodicyclohexyl methane, isophorondiamine, 2,2,4- and 2,4,4-trimethyl hexamethylenediamine, 2,5- and/or 2,6-bis-(aminomethyl)-norbornane; those obtainable from isophthalic acid, 4,4'-diaminodicyclohexyl methane and ω-caprolactam; those obtainable from isophthalic acid, 3,3-dimethyl-4,4'-diaminodicyclohexyl methane and ω-lauric lactam; and those obtainable from terephthalic acid and the isomer mixture of 2,2,4- and 2,4,4-trimethyl hexamethylenediamine.

Instead of using pure 4,4'-diaminodicyclohexyl methane, it is also possible to use mixtures of the position-isomeric diaminodicyclohexyl methanes which consist of 70 to 99 mol-% of the 4,4'-diamino isomer, 1 to 30 mol-% of the 2,4'-diamino isomer,
0 to 2 mol-% of the 2,2'-diamino isomer
and, optionally, corresponding more highly condensed diamines obtained by hydrogenation of diaminodiphenyl methane of technical quality.

Suitable thermoplastic polyamides may also consist of mixtures of partially crystalline and amorphous polyamides, the amorphous polyamide component being smaller than the partially crystalline polyamide component. The amorphous polyamides and their production are also known from the prior art (cf. for example Ullmann, Enzyklopädie der technischen Chemie, Vol. 19, page 50).

Preferred other thermoplastics b) are also so-called "LC polymers". Polymers referred to as LC polymers are those which can form liquid crystalline melts. Polymers of this kind, which are also described as "thermotropic", have been amply disclosed (see, for example, EP-OS 0 131 846, EP-OS 0 132 637 and EP-OS 0 134 959). In the stated literature references further literature is mentioned and the determination of the liquid crystalline state of polymer melts is also described.

"LC Polymers" are for example aromatic polyesters based on optionally substituted p-hydroxybenzoic acid, optionally substituted iso- and/or terephthalic acids, 2,7-dihydroxynaphthalene and other diphenols (EP-OS 0 131 846), aromatic polyesters based on optionally substituted p-hydroxybenzoic acid, diphenols, carbonic acid and optionally aromatic dicarboxylic acids (EP-OS 0 132 637) and aromatic polyesters based on optionally substituted p-hydroxybenzoic acid, 3-chloro-4-hydroxybenzoic acid, isophthalic acid, hydroquinone and 3,4'- and/or 4,4'-dihydroxydiphenyl, 3,4'- and/or 4,4'-dihydroxydiphenyl ether and/or 3,4'- and/or 4,4'-dihydroxydiphenylsulphide (EP-OS 0 134 959).

The LC polymers have a persistence length at room temperature of between 18 and 1300 Å, preferably between 25 and 300 Å and in particular between 25 and 150 Å.

The persistence length of a polymer at room temperature characterises the average convolution of a molecular chain in a diluted solution under theta conditions (cf. for example P. J. Flory, "Principles of Polymer Chemistry", Cornell Univ. Press, Ithaca, N.Y.) and half the Kuhn step length. The persistence length can be determined by various methods in dilute solutions, for example by light scattering and X-ray small-angle measurements. With appropriate preparation the persistence length can also be determined in solid bodies with the aid of neutron small-angle scattering. Further theoretical and experimental methods are for example described by S. H. Wendorff in "Liquid Crystalline Order in Polymers", e.g. A. Blumstein, Academic Press 1978, page f16 et seq. and in the references mentioned in "S. M. Aharoni, Macromolecules 19, (1986), page 429 et seq.".

Preferred other thermoplastics also include aromatic polyester carbonate.

Aromatic polyesters and polyester carbonates which can be used as the thermoplastic b) according to the invention are compounds of at least one aromatic bisphenol, for example of the formula (VII), of at least one aromatic dicarboxylic acid and optionally of carbonic acid. Suitable aromatic dicarboxylic acids are for example orthophthalic acid, terephthalic acid, isophthalic acid, tert.-butyl isophthalic acid, 3,3'-diphenyldicarboxylic acid, 4,4'-diphenyldicarboxylic acid, 4,4'-benzophenonedicarboxylic acid, 3,4'-benzophenonedicarboxylic acid, 4,4'-diphenyl ether dicarboxylic acid, 4,4'-diphenylsulphonedicarboxylic acid, 2,2-bis-(4-carboxyphenyl)-propane and trimethyl-3-phenylindane-4,5'-dicarboxylic acid.

Of the aromatic dicarboxylic acids terephthalic acid and/or isophthalic acid are particularly preferably used.

Aromatic polyesters and polyester carbonates can be produced by processes of the kind known from the literature for the production of polyesters or polyester carbonates, such as for example by processes in homogeneous solution, by transesterification processes in the melt and by the two phase interface process. Transesterification processes in the melt and in particular the two phase interface process are preferably used.

Transesterification processes in the melt (acetate process and phenyl ester process) are described for example in U.S. Pat. Nos. 3,494,885, 4,386,186, 4,661,580, 4,680,371 and 4,680,372, EP-A 26,120, 26,121, 26,684, 28,030, 39,845, 91,602, 97,970, 79,075, 146,887, 156,103, 234,913, 234,919 and 240,301 and DE-OS 1,495,626 and 2,232,977. The two phase interface process is described for example in EP-A 68,014, 88,322, 134,898, 151,750, 182,189, 219,708, 272,426, in DE-OS 2,949,024, 3,007,934, 3,440,020 and in Polymer Reviews, Volume 10, "Condensation Polymers by Interfacial and Solution Methods", Paul W. Morgan, Interscience Publishers, New York 1965, Chapter VIII, page 325, Polyesters.

In the acetate process it is generally bisphenol diacetate and in the phenyl ester process it is generally bisphenol, aromatic dicarboxylic acid or diphenyl esters of aromatic dicarboxylic acid and optionally diphenyl carbonate which are reacted, with the elimination of phenol and, where applicable, with the elimination of $CO_2$, to form the polyester or polyester carbonate. In the two-phase interface process the starting materials generally used for the production of polyesters and polyester carbonates are alkali metal bisphenolate, aromatic dicarboxylic acid dichloride and optionally phosgene. In this condensation reaction the polyester or the polyester carbonate are produced with the formation of alkali metal chloride. In general the salt formed is dissolved in the aqueous phase, whereas the polyester formed or the polyester carbonate formed are present in solution in the organic phase and are isolated therefrom.

Preferred other thermoplastics b) also include thermoplastic, linear or branched polyarylene sulfides. They have structural units corresponding to the following general formula

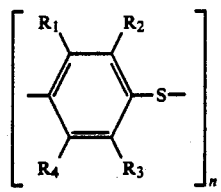

in which $R_1$ to $R_4$ may be independent or the same and represent $C_1$–$C_6$ alkyl, phenyl or hydrogen. The polyarylene sulfides may also contain diphenyl units.

Polyarylene sulfides and their production are known (see for example U.S. Pat. No. 3,354,129 and EP-A 0 171 021).

Preferred other thermoplastics b) are thermoplastic polyarylene sulfones.

Suitable polyarylene sulfones have average weight average molecular weights $\overline{M}w$ (as measured by the scattered light method in $CHCl_3$) in the range from 1,000 to 200,000 and preferably 20,000 to 60,000. Examples are the polyarylene sulfones obtainable in known manner from 4,4'-dichlorodiphenyl sulfone and a bisphenol, particularly 2,2-bis-(4-hydroxyphenyl)-propane, which have average weight average molecular weights $\overline{M}w$ of from 2,000 to 200,000.

These polyarylene sulfones are known (cf. for example U.S. Pat. No. 3,264,536, DE-AS 1 794 171, GB-PS 1,264,900, US-PS 3,641,207, EP-A-0 038 028, DE-OS 3 601 419 and DE-OS 3 601 420). The suitable polyarylene sulfones may also be branched in known manner (cf. for example DE-OS 2 305 413).

Preferred other thermoplastics b) also include thermoplastic polyphenylene oxides, preferably poly-(2,6-dialkyl-1,4-phenylene oxides). Polyphenylene oxides suitable for the purposes of the invention have weight average molecular weights $\overline{M}w$ (as measured by the scattered light method in chloroform) of from 2,000 to 100,000 and preferably from 20,000 to 60,000. These polyphenylene oxides are known.

The preferred poly-(2,6-dialkyl-1,4-phenylene oxides) may be obtained in known manner by oxidizing condensation of 2,6-dialkylphenols with oxygen in the presence of catalyst combinations of copper salts and tertiary amines (see for example DE-OS 21 26 434 and U.S. Pat. No. 3,306,875).

Suitable poly-(2,6-dialkyl-1,4-phenylene oxides) are, in particular, the poly-[2,6-di-($C_1$-$C_4$-alkyl)-1,4-phenylene oxides], such as for example poly-(2,6-dimethyl-1,4-phenylene oxide).

Preferred other thermoplastics b) also include aromatic polyether ketones (cf. for example GB-PS 1,078,234, U.S. Pat. No. 4,010,147 and EP-OS 0 135 938).

They contain the recurring structural element

in which —E'— is the residue of a bisaryl ketone having two bonds and —O—E—O— is a diphenolate residue having two bonds.

They may be obtained, for example, in accordance with GB-PS 1,078,234 from dialkali diphenolates having the formula alkali —O—E—O—alkali and bis-(haloaryl)-ketones having the formula hal-E'-hal (hal=-halogen). One suitable dialkali diphenolate is, for example, that of 2,2-bis-(4-hydroxyphenyl)-propane, while a suitable bis-(haloaryl)-ketone is 4,4'-dichlorobenzophenone.

Preferred other thermoplastics b) also include thermoplastic vinyl polymers.

Vinyl polymers in the context of the invention are homopolymers of vinyl compounds, copolymers of vinyl compounds and graft polymers of vinyl compounds on rubbers.

Homopolymers and copolymers suitable for the purposes of the invention and those of styrene, α-methyl styrene, acrylonitrile, methacrylonitrile, $C_1$-$C_{12}$ (cyclo)alkyl esters of (meth)acrylic acid, $C_1$-$C_4$-carboxylic acid vinyl esters, the copolymers also being obtainable from mixtures of these vinyl compounds by known methods.

The homopolymers or copolymers should have intrinsic viscosities of from 0.3 to 1.5 dl/g (as measured at 23° C. in toluene in known manner).

Suitable vinyl polymers are, for example, thermoplastic poly-$C_1$-$C_4$-alkyl methacrylates, for example those of methyl, ethyl, propyl or butyl methacrylate, preferably methyl or ethyl methacrylate. Both homopolymers and copolymers of these methacrylates are included. In addition, other ethylenically unsaturated, copolymerizable monomers, such as for example (meth)acrylonitrile, (α-methyl) styrene, bromostyrene, vinyl acetate, $C_1$-$C_8$ alkyl acrylate, (meth)acrylic acid, ethylene, propylene and N-vinyl pyrrolidone, may be copolymerized in small quantities.

The thermoplastic poly-$C_1$-$C_4$-alkyl methacrylates suitable for the purposes of the invention are known from the literature or may be obtained by methods known from the literature.

Suitable vinyl polymers also include copolymers of styrene or α-methyl styrene and acrylonitrile optionally containing up to 40% by weight of esters of acrylic or methacrylic acid, particularly methyl methacrylate or n-butyl acrylate. Styrene derivatives must always be present as monomers. The styrene derivatives are present in proportions of 100 to 10% by weight, preferably 90 to 20% by weight and more preferably 80 to 30% by weight and may be obtained by standard methods, such as radical polymerization in bulk, solution, suspension or emulsion, but preferably by radical emulsion polymerization in water.

Suitable graft polymers are formed by polymerization of the above-mentioned vinyl monomers or mixtures of vinyl monomers in the presence of rubbers having glass temperatures below 0° C. and preferably below −20° C. The graft polymers generally contain 1 to 85% by weight and preferably 10 to 80% by weight rubber. The graft polymers may be prepared by standard methods in solution, bulk or emulsion, preferably in emulsion; mixtures of vinyl monomers may be simultaneously or successively graft-polymerized.

Suitable rubbers are, preferably, diene rubbers and acrylate rubbers.

Diene rubbers are, for example, polybutadiene, polyisoprene and copolymers of butadiene with up to 35% by weight comonomers, such as styrene, acrylonitrile, methyl methacrylate and $C_1$-$C_6$ alkyl acrylates.

Acrylate rubbers are, for example, crosslinked, particulate emulsion polymers of $C_1$-$C_6$-alkyl acrylates, particularly $C_2$-$C_6$-alkyl acrylates, optionally in admixture with up to 15% by weight of other unsaturated monomers, such as styrene, methyl methacrylate, butadiene, vinyl methyl ether, acrylonitrile, and of at least one polyfunctional crosslinking agent, such as for example divinylbenzene, glycol-bis-acrylates, bis-acrylamides, phosphoric acid triallyl ester, citric acid triallyl ester, allyl esters of acrylic acid and methacrylic acid, triallyl isocyanurate, the acrylate rubbers containing up to 4% by weight of the crosslinking comonomers.

Mixtures of diene rubbers with acrylate rubbers and also rubbers having a core-shell structure are also suitable for the production of the graft polymers.

For graft polymerization, the rubbers must be present in the form of discrete particles, for example in the form of a latex. These particles generally have mean diameters of from 10 nm to 2000 nm.

The graft polymers may be produced by known methods, for example by radical emulsion graft polymerization of the vinyl monomers in the presence of rubber latices at temperatures of from 50° to 90° C. using water-soluble initiators, such as peroxodisulfate, or redox initiators.

Emulsion graft polymers produced by radical graft polymerization onto particulate, highly crosslinked rubbers (diene or alkyl acrylate rubbers) having gel contents of more than 80% by weight and mean particle diameters ($d_{50}$) of from 80 to 800 nm are preferred.

Technical ABS polymers are particularly suitable.

Mixtures of vinyl homopolymers and/or vinyl copolymers with graft polymers are also suitable.

Preferred other thermoplastics b) also include thermoplastic polyurethanes. These are reaction products of diisocyanates, completely or predominantly aliphatic oligo- and/or polyesters and/or ethers and one or more chain-extending agents. These thermoplastic-polyurethanes are substantially linear and have thermoplastic processing characteristics.

The thermoplastic polyurethanes are known or may be obtained by known methods (cf. for example U.S. Pat. No. 3,214,411; J. H. Saunders and K. C. Frisch, "Polyurethanes, Chemistry and Technology", Vol. II, pages 299 to 451, Interscience Publishers, New York, 1964; and Mobay Chemical Corporation "A Processing Handbook for Texin Urethane Elastoplastic Materials", Pittsburgh, Pa.).

Starting materials for the production of the oligoesters and polyesters are, for example, adipic acid, succinic acid, sebacic acid, suberic acid, oxalic acid, methyl adipic acid, glutaric acid, pimelic acid, azealic acid, phthalic acid, terephthalic acid and isophthali acid.

Adipic acid is preferred.

Suitable glycols for the production of the oligoesters and polyesters are, for example, ethylene glycol, 1,2- and 1,3-propylene glycol, butane-1,2-, -1,3-, -1,4-, -2,3- and -2,4-diol, hexanediol, bis-hydroxymethyl cyclohexane. diethylene glycol an 2,2-dimethyl propylene glycol. In addition, small quantities, i.e. up to 1 mol-%, of trihydric or higher alcohols, for example trimethylol propane, glycerol, hexanetriol etc., may be used together with the glycols.

The resulting hydroxyl oligoesters or polyesters have a molecular weight of at least 600, a hydroxyl value of from about 25 to 190 and preferably from about 40 to 150, an acid value of from about 0.5 to 2 and a water content of from about 0.01 to 0.2%.

Oligoesters and polyesters also include oligomeric or polymeric lactones, such as for example oligocaprolactone or polycaprolactone, and aliphatic polycarbonates, such as for example polybutane-1,4-diol carbonate or polyhexane-1,6-diol carbonate.

A particularly suitable oligoester which may be used as starting material for the thermoplastic polyurethanes is prepared from adipic acid and a glycol containing at least one primary hydroxyl group. The condensation is terminated when an acid value of 10 and preferably of about 0.5 to 2 is reached. The water formed during the reaction is thus separated off simultaneously or afterwards, so that the final water content is between about 0.01 to 0.05% and preferably between 0.01 to 0.02.

Oligoethers and polyethers for the production of the thermoplastic polyurethanes are, for example, those based on tetramethylene glycol, propylene glycol and ethylene glycol.

Polyacetals may also be regarded as polyethers and may be used as such.

The oligoethers or polyethers should have average molecular weights $\overline{M}n$ (number average determined via the OH value of the products) of from 600 to 2,000 and preferably from 1,000 to 2,000.

4,4'-Diphenyl methane diisocyanate is preferably used as the organic diisocyanate for the production of the polyurethanes. It should contain less than 5% 2,4'-diphenyl methane diisocyanate and less than 2% of the dimer of diphenyl methane diisocyanate. In addition, the acidity, expressed as HCl, should be in the range from about 0.005 to 0.2%. The acidity expressed as % HCl is determined by extraction of the chloride from the isocyanate in hot, aqueous methanol solution or by liberation of the chloride during hydrolysis with water and titration of the extract with standard silver nitrate solution in order to obtain the concentration of chloride ions present therein.

It is also possible to use other diisocyanates for the production of the thermoplastic polyurethanes, including for example the diisocyanates of ethylene, ethylidene, propylene, butylene, cyclo-1,3-pentylene, cyclo-1,4-hexylene, cyclo-1,2-hexylene, 2,4-tolylene, 2,6-tolylene, p-phenylene, n-phenylene, xylene, 1,4-naphthylene, 1,5-naphthylene, 4,4'-diphenylene; 2,2-diphenylpropane-4,4'-diisocyanate, azobenzene-4,4'-diisocyanate, diphenylsulfone-4,4'-diisocyanate, dichlorohexamethylene diisocyanate, pentamethylene diisocyanate, hexamethylene diisocyanate, 1-chlorobenzene-2,4-diisocyanate, furfuryl diisocyanate, dicyclohexyl methane diisocyanate, isophorone diisocyanate, diphenyl ethane diisocyanate and bis-(isocyanatophenyl)-ethers of ethylene glycol, butanediol, etc.

Suitable chain-extending agents are organic difunctional compounds containing active hydrogen reactive to isocyanates, for example diols, hydroxycarboxylic acids, dicarboxylic acids, diamines and alkanolamines and water. Examples of such chain-extending agents are, for example, ethylene, propylene and butylene glycol, butane-1,4-diol, butanediol, butynediol, xylylene glycol, amylene glycol, 1,4-phenylene-bis-β-hydroxyethyl ether, 1,3-phenylene-bis-β-hydroxyethyl ether, bis-(hydroxymethylcyclohexane), hexanediol, adipic acid, ω-hydroxycaproic acid, thiodiglycol, ethylenediamine, propylene, butylene, hexamethylene, cyclohexylene, phenylene, tolylene and xylylenediamine, diaminodicyclohexyl methane, isophoronediamine, 3,3'-dichlorobenzidine, 3,3'-dinitrobenzidine, ethanolamine, aminopropyl alcohol, 2,2-dimethyl propanolamine, 3-aminocyclohexyl alcohol and p-aminobenzyl alcohol. The molar ratio of oligoester or polyester to bifunctional chain extender is in the range from 1:1 to 1:50 and preferably in the range from 1:2 to 1:30.

In addition to difunctional chain-extending agents, it is also possible to use trifunctional or more than trifunctional chain-extending agents in small quantities of up to about 5 mol-%, based on mols of difunctional chain-extending agents used.

Examples of trifunctional or ore than trifunctional chain-extending agents are glycerol, trimethylol propane, hexanetriol, pentaerythritol and triethanolamine.

Monofunctional components, for example butanol, may also be used for the production of the thermoplastic polyurethanes.

The diisocyanates, oligoesters, polyesters, polyethers, chain-extending agents and monofunctional components mentioned as structural units for the thermoplastic polyurethanes are either known from the literature or may be obtained by methods known from the literature.

The known production of the polyurethanes may be carried out, for example, as follows:

For example, the oligoesters or polyesters, the organic diisocyantes and the chain-extending agents may be individually heated, preferably to a temperature of from about 50° to 220° C., and then mixed. The oligoesters or polyesters are preferably first individually heated, then mixed with the chain-extending agents and the resulting mixture mixed with the preheated isocyanate.

The starting components for the production of the polyurethane may be mixed by any mechanical stirrer which provides for intensive mixing in a short time. If the viscosity of the mixture should prematurely rise too quickly during stirring, either the temperature may be lowered or a small quantity (0.001 to 0.05% by weight, based on ester) citric acid or the like may be added to reduce the reaction velocity. To increase the reaction velocity, suitable catalysts, such as for example the tertiary amines mentioned in U.S. Pat. No. 2,729,618, may be used.

Examples of elastomers b3) are the most diverse rubbers, such as ethylene/propylene rubber, polyisoprene, polychloroprene, polysiloxanes, atactic polypropylene, diene, olefin and acrylate rubbers as well as natural rubbers, styrene/butadiene block copolymers, ethylene copolymers with vinyl acetate or with (meth)acrylic acid esters, elastic polyurethanes, elastic polycarbonate polyether block copolymers and polyester polyether block copolymers.

It is preferable to use copolymers—in particular graft copolymers (graft rubbers)—with elastomeric properties, which are essentially obtainable from at least two of the following monomers: chloroprene, butadiene, isoprene, isobutene, styrene, acrylonitrile, ethylene, propylene vinyl acetate and (meth)acrylic acid esters with 1 to 18 C atoms in the alcohol component, i.e. polymers of the kind described for example in "Methoden der Organischen Chemie", Houben-Weyl, Vol. 14/1, Georg Thieme Verlag, Stuttgart 1961, pages 393 to 406 and in C. B. Bucknall, "Thoughened Plastics", Appl. Science Publishers, London, 1977. The preferred polymers have a gel content of higher than 20, and preferably higher than 40% by weight.

Examples which may be mentioned are ethylene/vinyl acetate copolymers with 15 to 45% by weight of vinyl acetate units and melt indices of from non-flowable to 1000, preferably from 0.1 to 20, measured according to DIN 53 735 at 190° C. and a load of 2.16 kp.

The following may also be mentioned: the so-called EPM or EPDM rubbers in which the weight ratio of ethylene to propylene radicals is in the range of 40:60 to 90:10, and preferably 40:60 to 65:35.

The Mooney-viscosities ($ML_{1+4}/100°$ C.) of the non-crosslinked EPM or EPDM rubbers are between 25 and 100, and preferably between 35 and 90. The gel contents of the non-crosslinked EPM or EPDM rubbers are below 1% by weight.

The ethylene/propylene copolymers (EPM) used contain virtually no double bonds, whereas the ethylene/propylene/diene terpolymers (EPDM) may contain 1 to 20 double bonds per 1000 C atoms. The following may for example be mentioned as suitable diene monomers in the EPDM: conjugated dienes, such as for example isoprene and butadiene, and non-conjugated dienes with 5 to 25 C atoms, such as for example 1,4-pentadiene, 1,4-hexadiene, 1,5-hexadiene, 2,5-dimethyl-1,5-hexadiene and 1,4-octadiene; cyclic dienes, such as, for example, cyclopentadiene, cyclohexadiene, cyclooctadiene and dicyclopentadiene; alkenyl norbornenes, such as for example 5-ethylidene-2-norbornene, 5-butylidene-2-norbornene, 2-metallyl-5-norbornene, 2-isopropenyl-5-norbornene and tricyclodienes, such as for example 3-methyl-tricyclo-(5,2,1,0,2,6)-3,8-decadiene. The non-conjugated dienes 1,5-hexadiene, ethylidene norbornene and dicyclopentadiene may preferably be mentioned. The diene content in the EPDM is preferably 0.5 to 10% by weight.

Such EPM or EPDM rubbers are described for example in DE-OS 28 08 709.

The following are also suitable as elastomers C): selectively hydrogenated block copolymers of a vinylaromatic monomer (X) and a conjugated diene (Y) of the X-Y-type. These block copolymers can be prepared by known processes (for example Kvaton G ® from the Shell Company).

In general, the technique used for the production of styrene/diene block copolymers and described in "Encyclopedia of Polymer Science and Technology", vol. 15, Interscience, New York (1971) on pages 508 et seq., can be used by the production of the suitable X-Y block copolymers of for example styrene, α-methylstyrene and/or vinyl toluene and of conjugated dienes, such as butadiene and/or isoprene. The selective hydrogenation can be carried out by methods known per se and means that the ethylenic double bonds are for the most part completely hydrogenated whereas the aromatic double bonds remain essentially unaffected.

Such selectively hydrogenated block copolymers are described for example in DE-OS 30 00 282.

The following are also suitable: polybutadienes grafted with styrene and/or acrylonitrile and/or alkyl (meth)acrylates, butadiene/styrene copolymers and poly(meth)acrylates, such as for example copolymers of styrene or alkyl styrene and conjugated dienes (impact-resistant polystyrene), i.e. copolymers of the kind described in DE-OS 16 94 173 (=U.S. Pat. No. 3,564,077), polybutadienes grafted with acrylates or methacrylates, vinyl acetate, acrylonitrile, styrene and/or alkyl styrenes, butadiene/styrene or butadiene/acrylonitrile copolymers, or polyisobutenes or polyisoprenes, of the kind described in DE-OS 23 48 377 (=U.S. Pat. No. 3,919,353) or in DE-OS 105 364 and DE-OS 3,019,233.

Particularly preferred elastomers are ABS polymers (both mixed and graft types) of the kind described for example in DE-OS 20 35 390 (=U.S. Pat. No. 3,644,574) or in DE-OS 22 48 242 (=GB PS 1,409,275).

In addition, elastomers are most preferably used which are obtainable by a graft reaction of I. 10 to 40, preferably 10 to 35, in particular 15 to 25% by weight, based on the graft product, of at least one (meth)acrylate and/or a mixture of 10 to 35, preferably 20 to 35, % by weight, based on the mixture, of acrylonitrile and 65 to 90, preferably 65 to 80, % by weight, based on the mixture, of styrene onto II. 60 to 90, preferably 65 to 90, in particular 75 to 85% by weight, based on the graft product, of a butadiene polymer containing at least 70% by weight, based on II, of butadiene radicals, as the graft substrate wherein the gel content of the graft substrate II is ≧70% (measured in toluene), the degree of grafting G is 0.15 to 0.55 and the average particle diameter $d_{50}$ of the graft polymer C) is 0.2 to 0.6, and preferably 0.3 to 0.5 μm (cf. for example DE-OS 3,324,398 and EP-A 56 243).

Particularly preferred elastomers also include graft polymers of a) 25 to 98% by weight, based on the graft product, of an acrylate rubber having a glass transition temperature of lower than −20° C. as the graft substrate and b) 2 to 75% by weight, based on the graft product, of at least one polymerisable, ethylenically unsaturated monomer, the homo- or copolymers of which, produced in the absence of (a), would have a glass transition temperature of higher than 25° C., as graft monomers (cf. for example EP-A 50,265).

In addition to the abovementioned elastomers it is also possible to use elastic polyurethanes (e.g. Texin ®), elastic polyester/polyether block copolymers (e.g. Hytrel ®) and elastic polycarbonate/polyether block copolymers. These elastomers are known and described for example in H. G. Elias, Makromoleküle, Hüthig and Wepf Verlag Basel, 4th edition 1981, page 787, and A. Noshay and J. E. McGrath, Block Copolymers, Academic Press New York, 1977, page 341.

Silican graft rubbers of the kind described for example in DE-OS 3,629,763, are also suitable as the elastomers to be used.

These elastomers are known.

The mixtures of the polycarbonates a) and the elastomers b3) may be prepared, for example, by mixing components a) and b3) in the melt in standard units, such as kneaders, single-screw or multiple screw extruders or rolls.

The present invention also relates to a process for the production of mixtures of 0.1 to 99.9% by weight, preferably 1 to 98% by weight and more preferably 2.5 to 90% by weight polycarbonate a) with 99.9 to 0.1% by weight, preferably 99 to 2% by weight and, more preferably, 97.5 to 10% by weight elastomer b3), characterized in that polycarbonate a) is melted and elastomer b3) is added and homogenized in the melt of the polycarbonate.

The mixtures of the polycarbonates a) and the other thermoplastics b1) or b2) may be prepared, for example, by mixing solutions of components a) and b) or by mixing the components in kneaders, on rolls or in single-screw or multiple-screw extruders.

The invention also relates to a process for the production of mixture of 0.1 to 99.9% by weight, preferably 1 to 98% by weight and more preferably 2.5 to 90% by weight polycarbonate a) with 99.9 to 0.1% by weight, preferably 99 to 2% by weight and, more preferably, 97.5 to 10% by weight other thermoplastics b1) or b2), characterized in that all the components are mixed in the form of solutions and the resulting mixture is worked up in the usual way or all the components are mixed and homogenized in the melt.

The additives normally used for the components b), for example fillers and/or nucleating agents and/or fibers and/or lubricants and/or softener and/or colourants, may be added to the mixtures in the usual quantities as component c).

Inorganic fillers are, for example, ceramic fillers, such as aluminium nitrite, silicates, titanium dioxide, talcum, chalk, mica, carbon black; fibers are, for example, those of glass, carbon or of liquid-crystal polymers.

Examples of nucleating agents are barium sulfate and $TiO_2$.

These additives may be added in the usual quantities to the components b) either before the preparation of the mixtures according to the invention or together with the polycarbonates of component a) or may be subsequently incorporated in the mixtures according to the invention of components a) and b).

Similarly, the additives mentioned may be added in the usual quantities to the polycarbonates of component a) before or during or after mixing with component b).

The mixtures according to the invention may be processed in the usual way in standard mixing units to form moldings of any kind.

The mixtures according to the invention may, for example, be used for the production of hub caps, dashboards and stering column casings for motor vehicles. If a high degree of toughness is also required at low temperatures, such as for example for bumpers, spoilers and impact strips mixtures containing elastomers (component b3)) as the second component are advantageous.

The mixtures according to the invention can also be used for household devices such as casings for electrical appliances, multipoint connectors and sinks.

In particular, films can be produced from the mixtures of the invention. The films have preferred thicknesses of between 1 and 1500 $\mu$m and particularly preferred thicknesses of between 10 and 900 $\mu$m.

The films obtained may be stretched monoaxially or biaxially in a known manner, preferably in a ratio of 1:1.5 to 1:3.

The films can be produced by the known methods for the production of films, for example, by extrusion of polymer melt through a sheet die, by blowing in a film-blowing machine, by deep drawing or by casting. The latter is carried out by pouring a concentrated solution of the polymer in a suitable solvent on to a flat substrate, evaporating the solvent and lifting the film produced away from the substrate.

Films produced by extrusion, generally at 80° to 450° C. depending on component b) of the mixture and the composition by weight of the mixture of components a), b) and c), are often biaxially stretched after cooling by at least 20° C. Films suitable for deep drawing may also be obtained by rolling out preformed moldings of the mixtures of a), b) and c) at temperatures of up to about 290° C.

Cast films are obtained by casting optionally concentrated solutions of the polymer mixtures onto flat surfaces and evaporating the solvent at 25° to 280° C. In addition to planeparallel plates of materials of minimal surface roughness, such as for example glass, ceramics, steel, etc., the flat surface used may also be the surface of a liquid which has a higher density than the polymer solution and does not dissolve either the polymers or their solvents.

The films according to the invention may be used either on their own or in combination with films of other polymers.

Depending on the composition of the mixture and the choice of components b) and, optionally, c) it is possible in particular to produce films up to 1000 $\mu$m thick and more especially up to 800 $\mu$m thick which are highly permeable to light and which, depending on the choice of an additional film for the composite film or of components b)/c), have a highly uniform surface structure. These films are easy to print and are scratch-resistant.

The films according to the invention may be used as information carriers in many branches of industry. Examples of application include monitoring and warning systems for automotive instruments and scales of domestic appliances, industrial machinery and office machinery and also electrical insulating films.

More particularly, the films may be used for any applications requiring high heat resistance.

For certain applications, it can be of advantage to coat the films according to the invention with a protective lacquer.

The films or composite films can also be produced and used in known manner in the form of homogeneous membranes, composition membranes or asymmetric membranes. The membranes, films or composite films can be flat, form hollow articles of various geometrical shapes—cylindrical, spherical or tubular—or can also be hollow fibers. Such molded articles can be produced by the methods known to those skilled in the art.

The films according to the invention have particularly high dimensional stability under heat and are permeable to many gases while nevertheless being highly selective. They can therefore be advantageously used for gas permeation.

EXAMPLES

C) Components

C1) Corresponds to Example B1)

C2) Polystyrene prepared by radical polymerization of styrene in known manner, $\overline{M}w$ (as measured by light scattering) 260,000

C3) Bisphenol-A-polycarbonate, relative viscosity $\eta_{rel}$ (as measured in $CH_2Cl_2$ at 25° C. and C=0.5 g/dl) 1.28

C4) Polymethyl methacrylate V811 (Röhm & Haas)

C5) Polycaprolactam, relative solution viscosity 3.0 (as measured on a 0.5% by weight solution in m-cresol)

C6) Polyethylene terephthalate with an intrinsic viscosity of 0.72, measured in phenol/o-dichlorobenzene/weight ratio 1:1 at 25° C.

C7) Polybutylene terephthalate with an intrinsic viscosity of 1.21, measured in phenol/o-dichlorobenzene/weight ratio 1:1 at 25° C.

C8) EPM rubber Exxelor VA 1803 from the Esso Company

C9) An emulsion polymer of 80 parts by weight of a crosslinked polybutadiene (gel content higher than 70% by weight (toluene) and 20 parts by weight of a graft substrate consisting of 18 parts by weight of methyl methacrylate and 2 parts by weight of n-butyl acrylate, the average particle size of the graft substrate present in Latex from being between 0.3 and 0.4 μm.

C10) Poly(2,6-dimethyl-1,4-phenylene)-ether with a relative viscosity $\eta_{rel}$ of 1.62, measured in chloroform at 25° C. (0.5% by weight solution).

C11) Aromatic polyester carbonate based on bisphenol A with an ester content of 50% by weight (isophthalic acid:terephthalic acid=1:1) having a relative viscosity of 1.30 (0.5% by weight solution in methylene chloride)

C12) Aromatic polyester carbonate based on bisphenol A with an ester content of 80% by weight (isophthalic acid:terephthalic acid=1:1) having a relative viscosity of 1.30 (0.5% by weight solution in methylene chloride).

C13) Polyether sulphone based on bisphenol A, produced by reacting dichlorodiphenylsulphone and bisphenol A in diphenylsulphone by known methods, having a relative viscosity of 1.249 (0.5% by weight solution in methylene chloride).

C14) Polyether ketone based on bisphenol A, produced by reacting difluorobenzophenone and bisphenol A by known methods, having a relative viscosity of 1.455 (0.5% by weight solution in methylene chloride).

C15) Copolymer of styrene and acrylonitrile with an acrylonitrile content of 28% by weight, produced by emulsion polmyerisation).

C16) corresponds to Example B13)

C17) corresponds to Example B14)

C18) corresponds to Example B7).

D) Mixtures

D1) 37 g of C1) and 37 g C2) were each dissolved in 200 ml methylene chloride. The solutions were then combined, the solvent was partly removed in vacuo to leave a thickened solution from which 200 μm thick films were produced on a film drawing bench. Six pieces of this film were laid one on top of the other and pressed in air for 5 minutes at 270° C. under a pressure of 200 bar to form a rectangular laminate having a thickness of 1.042 mm.

D2) 30 g C1) and 30 g C2) were each dissolved in 200 ml methylene chloride. The solutions were then combined, the solution was thickened as in Example D1) and a 210 μm thick film was produced. Six pieces of the film were placed one on top of the other as in Example D1) and pressed in air for 5 minutes at 250° C. under a pressure of 210 bar to form a rectangular laminate having a thickness of 0.989 mm.

D3) 25 g of C1) and 25 g of C4) were each dissolved in 200 ml methylene chloride. The solutions were then combined and the solvent partially removed in in vacuo to leave a thickened solution from which a 200 μm thick film was prepared on a film drawing bench. Six pieces of this film were placed one on top of the other and pressed in air for 5 minutes at 270° C. under a pressure of 200 bar to form a rectangular laminate having a thickness of 0.61 mm.

D4) 70 g of C5) and 30 g C1) were melted at a temperature of about 260° C. to 280° C. and homogenized in a flask. After the melt had cooled, the mixture was granulated and the granulate was pressed to form a 1.6 mm thick molding in the same way as described in Example D3).

D5) 35 g C6) and 15 g B1) were pressed as described in Example D4) to form a 1.6 mm thick molding.

D6) 60 g of substance C16) are mixed with 40 g of substance C7) and pressed to form a 1.6 mm thick molding as described in Example D4).

D7) 40 g of substance C16) are mixed with 60 g of substance C7) and pressed to form a 1.6 mm thick molding as described in Example D4).

D8) 60 g of substance C16) are mixed with 40 g of substance C6) and pressed to form a 1.6 mm thick molding as described in Example D4).

D9) 40 g of substance C16) are mixed with 60 g of substance C6) and pressed to form a 1.6 mm thick molding as described in Example D4).

D10) 80 parts by weight of substance C16) are homogenized with 20 parts by weight of substance C8) in a twin-screw extruder at temperatures of 340° C. and injection-molded to form test specimens measuring 80×10×4 mm in a conventional injection-molding machine.

D11) 80 parts by weight of substance C16) are homogenized with 20 parts by weight of substance C9) in a twin-screw extruder at temperatures of 340° C. and injection-molded to form test specimens measuring 80×10×4 mm in a conventional injection-molding machine.

D12) 70 g of substance C18) and 30 g of substance C11) are each dissolved in 400 ml of methylene chloride. The solutions are combined and the solvent is almost completely removed in vacuo; films of a thickness of 190 μm are produced from the thickened solution on a film-spreading bench. 6 pieces of this film are placed on top of each other and pressed in air for 5 mins. at 270° C. under a pressure of 200 bar, to form a rectangular molding with a thickness of 0.92 mm.

D13) 30 g of substance C18) and 70 g of substance C11) are each dissolved in 400 ml of methylene chloride. The solutions are combined and the solvent almost completely removed in vacuo; films with a thickness of 200 μm are produced from the thickened solution on a film-spreading bench. 6 pieces of this film are placed on top of each other and pressed in air for 5 mins. at 270° C. under a pressure of 200 bar, to form a rectangular molding with a thickness of 1.0 mm.

D14) 70 g of substance C18) and 30 g of substance C12) are each dissolved in 400 ml of methylene chloride. The solutions are combined and the solvent almost completely removed in vacuo; films with a thickness of 200 μm are produced from the thickened solution on a film-spreading bench. 6 pieces of this film are placed on top of each other and pressed in air for 5 mins. at 270° C. under a pressure of 200 bar, to form a rectangular molding with a thickness of 0.98 mm.

D15) 30 g of substance C18) and 70 g of substance C12) are each dissolved in 400 ml of methylene chloride. The solutions are combined and the solvent almost completely removed in vacuo; films with a thickness of 180 μm are produced from the thickened solution on a film-spreading bench. 6 pieces of this film are placed on top of each other and pressed in air for 5 mins. at 270° C. under a pressure of 200 bar, to form a rectangular molding with a thickness of 0.8 mm.

D16) 70 g of substance C18) and 30 g of substance C10) are each dissolved in 400 ml of tetrahydrofuran. The solutions are combined and the solvent almost completely removed in vacuo; films with a thickness of 190 μm are produced from the thickened solution on a film-spreading bench. 6 pieces of this film are placed on top of each other and pressed in air for 5 mins. at 270° C. under a pressure of 200 bar, to form a rectangular molding with a thickness of 1.05 mms.

D17) 30 g of substance C18) and 70 g of substance C10) are each dissolved in 400 ml of tetrahydrofuran. The solutions are combined and the solvent almost completely removed in vacuo; films with a thickness of 200 μm are produced from the thickened solution on a film-spreading bench. 5 pieces of this film are placed on top of each other and pressed in air for 5 mins. at 270° C. under a pressure of 200 bar, to form a rectangular molding with a thickness of 0.7 mm.

D18) 70 g of substance C18) are mixed with 30 g of substance C13) and pressed to form a molding of a thickness of 1.5 mm as described in Example D4).

D19) 70 g of substance C18) are mixed with 30 g of substance C14) and pressed to form a molding of a thickness of 1.6 mm as described in Example D4).

D20) 60 g of substance C17) and 40 g of substance C15) are each dissolved in 400 ml of methylene chloride. The solutions are combined and the solvent is almost completely removed in vacuo; films with a thickness of 200 μm are produced from the thickened solution on a film-spreading bench. 6 pieces of this film are placed on top of each other and pressed in air for 5 mins. at 270° C. under a pressure of 200 bar, to form a rectangular molding with a thickness of 1.0 mm.

E) Testing of the Specimens Produced in Accordance with D

The shear modulus of the test specimens was measured above room temperature using a Brabender type 802301 tortion pendulum. The test specimen was heated to the temperature shown below at a heating rate of 1 K/minute, the test specimens being subjected to a tensile load of 10 p throughout the measurement period. The torque was 1570 gcm². At modulus values below 10 Mpa, deformation of the test specimens is clearly noticeable because they no longer have sufficient internal strength.

RESULTS

| Example No. | Shear modulus in MPa at | | |
|---|---|---|---|
| | T = 50° C. | T = 160° C. | T = 200° C. |
| Component C2) | 1000 | <10 | <10 |
| Component C3) | 950 | <10 | <10 |
| Component C4) | 980 | <10 | <10 |
| Component C5) | 400 | 120 | 70 |
| Component C6) | 800 | 50 | 40 |
| D1) | 1000 | 80 | 65 |
| D2) | 950 | 230 | 57 |
| D3) | 1050 | 20 | — |
| D4) | 1000 | 200 | 40 |
| D5) | 950 | 180 | 80 |
| D6) | 950 | 150 | 20 |
| D7) | 900 | 120 | 25 |
| D8) | 900 | 400 | 20 |
| D9) | 900 | 200 | 25 |
| D10) | 400 | 290 | 180 |
| D11) | 700 | 550 | 10 |
| D12) | dimensionally stable up to 230° C. | | |
| D13) | dimensionally stable up to 230° C. | | |
| D14) | dimensionally stable up to 230° C. | | |
| D15) | dimensionally stable up to 230° C. | | |
| D16) | dimensionally stable up to 230° C. the components are not completely compatible | | |
| D17) | dimensionally stable up to 230° C. the components are not completely compatible | | |
| D18) | dimensionally stable up to 234° C. | | |
| D19) | dimensionally stable up to 234° C. | | |
| D20) | dimensionally stable up to 177° C. | | |

F) Characterization of Permeation Behavior: Determination of the Permeability to Gases (Permeation) of Polymer Membranes The passage of a gas through an impervious polymer membrane is described by a dissolving/diffusion process. The characteristic constant for this process is the permeation coefficient P which indicates the gas volume V which passes through a film of known surface area F and thickness d in a certain time t for a given pressure difference Δp. For the steady state, the following may be deduced from the differential equation of the permeation process;

$$P = \frac{V \cdot d}{F \cdot t \cdot \Delta p} \tag{1}$$

In addition, permeation is dependent on temperature and gas humidity.

The measuring arrangement consists of a thermostatically controlled 2-chamber system. One chamber is designed to accommodate the test gas and the other to accommodate the permeate. The two chambers are separated by the membrane to be measured.

Before the gas is introduced, the two chambers are evacuated to $10^{-3}$ mbar and the first chamber is filled with gas. The permeated gas (inert gases) then produces an increase in pressure in the permeate chamber for constant volume, the increase in pressure being quantitatively recorded by a pressure recorder (an MKS Baratron) as a function of time until the passage of gas reaches the steady state. V is calculated therefrom at NTP. The predetermined pressure difference taking the outside air pressure Δp into account is adjusted in each case to $10^5$ Pa. The surface area of the membrane F is known. The membrane thickness d is determined by micrometer guage as the mean value of ten independent thickness measurements distributed over the membrane surface.

From these values, the permeation coefficient P may be determined in accordance with (1) with the following dimension:

$$\frac{cm^3 \, (NTP) \cdot mm}{m^2 \cdot 24 \, h \, 10^5 \, Pa}$$

based on a membrane thickness of 1 mm.

Further measurement parameters are:
Temperature: 25°±1° C.
Relative gas humidity: 0%

G) Production of a Film

EXAMPLE G1)

20 g polycarbonate corresponding to Example B2 and 20 g aromatic polyester carbonate of 50 parts by weight polycarbonate and 50 parts by weight aromatic polyester based on bisphenol A and iso-/terephthalic acid (1:1), relative solution viscosity 1.30, as measured in methylene chloride at c=0.5 g/dl and 25° C.; glass temperature 172° C., were each dissolved with intensive stirring in 200 ml methylene chloride, the two solutions were combined and, after thickening, an approximately 150 μm thick film was produced on a flat glass plate. The film was dimensionally stable at 190° C. The film was dried in vacuo for 4 hours at a temperature of 90° C. The permeation coefficient P was then measured:
for $O_2$: 184.9
for $CO_2$: 1106.6
for $N_2$: 39.5
for $CH_4$: 42.3

This film was combined with a 154 μm thick film of bisphenol A polycarbonate, relative viscosity 1.28; glass temperature 150° C., by pressing for about 3 minutes at around 200° C. under a pressure of 210 bar to form a composite film which had a thickness of approximately 250 μm.

This composite film was still dimensionally stable at 190° C. Permeation coefficient P:
for $O_2$: 112.3
for $CO_2$: 703.7
for $N_2$: 31.4
(measured as above).

EXAMPLE G2)

A mixture was prepared from 15 g poly-p-phenylene sulfide, prepared in accordance with EP-PS 142 024, Example 2, melt viscosity 120 Pa.s, as measured at 306° C. and at a shear rate of 1000/second, and another 15 g of component C1) (corresponding to Example B1) by thorough mixing in a small kneader at around 310° C. An approximately 403 μm thick film was then pressed from the mixture at 280° C. under a pressure of 200 bar (pressing time: approximately 4 minutes).

The following permeation values (measured as described above) were obtained for high heat resistance with no significant fall in modulus above 100° C. to 230° C.:
for $O_2$: 27.1
for $CO_2$: 114.3.

For comparison, the $O_2$ and $CO_2$ permeation values were measured for poly-p-phenylene sulfide only. The corresponding film was prepared from the already described material by pressing for 4 minutes at approximately 280° C.

The film had a thickness of 387 μm.
Permeation for $O_2$: 4.4
Permeation for $CO_2$: 18.6
The film showed a distinct fall in modulus between 80° C. and 150° C.

EXAMPLE G3)

The permeation coefficients P of a film produced on a film-spreading bench according to Example D3) and having a thickness of 61 μm, were determined:
$O_2$: 21.1
$N_2$: 2.7
$CH_4$: 3.5
$CO_2$: 94.2

The film was dimensionally stable up to about 160° C.

EXAMPLE G4)

The permeation coefficients P of a film produced according to Example D2) and having a thickness of 100 μm, were determined:
$O_2$: 136.9
$N_2$: 27.4
$CH_4$: 39.1
$CO_2$: 836.4

The film was dimensionally stable up to about 180° C.

Accordingly, the Example according to the invention illustrates the major advantage of the films according to the invention, namely high heat resistance and good permeation properties.

We claim:
1. Mixtures containing
   a) thermoplastic polycarbonates based on diphenols corresponding to formula (I)

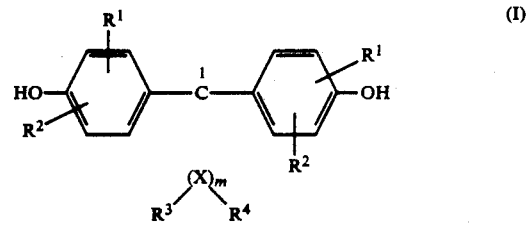

(I)

in which
   $R^1$ and $R^2$ independently of one another represent hydrogen, halogen, $C_1$–$C_8$ alkyl, $C_5$–$C_6$ cycloalkyl, $C_6$–$C_{10}$ aryl and $C_7$–$C_{12}$ aralkyl,
   m is 4 or 5,
   $R^3$ and $R^4$ may be individually selected for each X and independently of one another represent hydrogen or $C_1$–$C_6$ alkyl and
   X represents carbon, with the proviso that, at at least one atom X, both $R^3$ and $R^4$ are alkyl, and
   b) elastomers or other thermoplastics than those of component a) and, optionally,
   c) standard additives.
2. Mixtures containing a) 0.1 to 99.9% by weight high molecular weight, thermoplastic aromatic polycarbonates having weight average molecular weights $\overline{M}w$ of at least 10,000 which contain difunctional carbonate structural units corresponding to the formula

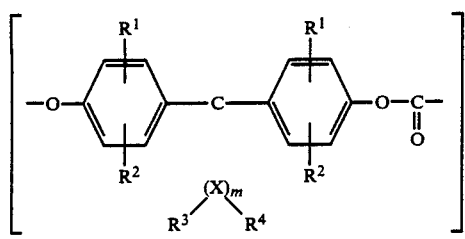

(Ia)

in which

X, $R^1$, $R^2$, $R^3$, $R^4$ and m have the meanings as defined for formula (I) in claim 1, in quantities of 100 mol-% to 2 mol %, based on the total quantity of 100 mol-% of difunctional carbonate structural units in addition to the quantity complementary to 100 mol-% of other carbonate structural units, and b) 99.9 to 0.1% by weight elastomers or other thermoplastics than the polycarbonates (a).

3. A process for the production of the mixtures claimed in claim 1 containing elastomers as (b), characterized in that (a) is melted and the elastomer (b) and, optionally, typical additives (c) are added and homogenized in the melt of component (a).

4. A process for the production of the mixtures claimed in claim 1 containing as (b) other thermoplastics than the polycarbonates (a), characterized in that (a), (b) and, optionally, standard additives (s) are mixed in the form of solutions and the resulting mixture is worked up in the usual way and mixed and homogenized in the melt.

5. Films of mixtures according to claim 1.

6. Films of mixtures according to claim 1 having a thickness of 1 to 1500 μm.

7. Composite films of films of mixtures according to claim 1 and other polymeric films.

8. A thermoplastic molding composition comprising
(a) 0.1 to 99.9% by weight of a thermoplastic aromatic polycarbonate having a weight average molecular weight of at least 10,000 containing structural units

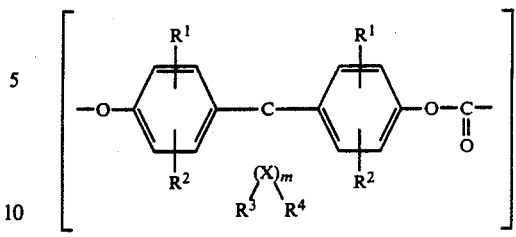

(Ia)

in which $R^1$ and $R^2$ independently represent hydrogen, halogen, $C_1$–$C_8$ alkyl, $C_5$–$C_6$ cycloalkyl, $C_6$–$C_{10}$ aryl or $C_7$–$C_{12}$ aralkyl, m is 4 or 5, $R^3$ and $R^4$ are individually selected for each X and independently represent a hydrogen or $C_1$–$C_6$ alkyl and X represents carbon, with a proviso that in at least one atom X, both $R^3$ and $R^4$ are alkyl, and (b) at least one member selected from the group consisting of
(b1) amorphous thermoplastics,
(b2) partially crystalline thermoplastics,
(b3) elastomers having a glass temperature below 0° C.

9. The thermoplastic molding composition of claim 8 wherein said (b1) is at least one member selected from the group consisting of polycarbonate, polyester, polyester carbonate, polyamide, polyolefin, polysulfone, polyketone, thermoplastic vinyl polymer, polyether, polyimide and thermoplastic polyurethane resins.

10. The thermoplastic molding composition of claim 8 wherein said (b2) is at least one member selected from the group consisting of aliphatic polyester, polyarylene sulphide and partially crystalline polycarbonate, partially crystalline polyester, partially crystalline polyester carbonate, partially crystalline polyamide, partially crystalline polyolefin, partially crystalline polysulphone, partially crystalline polyketone, partially crystalline thermoplastic vinyl polymer, partially crystalline polyether, partially crystalline polyimide and partially crystalline thermoplastic polyurethane resins.

11. The thermoplastic molding composition of claim 8 wherein said (b3) is at least one member selected from the group consisting of ethylene propylene rubber, polyisoprene, polychloroprene, polysiloxane, atactic polypropylene, diene, olefine rubber, acrylate rubber, natural rubber, styrene butadiene block copolymer, ethylene vinyl acetate copolymer, ethylene(meth)acrylate, elastic polyurethane rubber and elastic polycarbonate-polyether block copolymers.

* * * * *